United States Patent
Kunc et al.

(10) Patent No.: US 12,199,869 B2
(45) Date of Patent: Jan. 14, 2025

(54) DISTRIBUTED SOFTWARE-DEFINED NETWORK

(71) Applicant: MIMYR, LLC, Torrance, CA (US)

(72) Inventors: Robert Kunc, Rancho Palos Verdes, CA (US); Andrew Hung, Los Angeles, CA (US); David Wang, Rancho Palos Verdes, CA (US); Michael Mavraganis, Rancho Palos Verdes, CA (US)

(73) Assignee: MIMYR, LLC, Torrance, CA (US)

( * ) Notice: Subject to any disclaimer, the term of this patent is extended or adjusted under 35 U.S.C. 154(b) by 0 days.

(21) Appl. No.: 18/418,000

(22) Filed: Jan. 19, 2024

(65) Prior Publication Data

US 2024/0205153 A1    Jun. 20, 2024

Related U.S. Application Data

(63) Continuation of application No. 18/052,144, filed on Nov. 2, 2022, now Pat. No. 11,924,104, which is a
(Continued)

(51) Int. Cl.
*H04L 45/76* (2022.01)
*H04L 45/02* (2022.01)
(Continued)

(52) U.S. Cl.
CPC ............ *H04L 45/76* (2022.05); *H04L 45/02* (2013.01); *H04L 45/74* (2013.01); *H04L 69/22* (2013.01); *H04W 24/02* (2013.01); *H04W 40/02* (2013.01)

(58) Field of Classification Search
None
See application file for complete search history.

(56) References Cited

U.S. PATENT DOCUMENTS 9,749,214 B2    8/2017  Han
9,843,624 B1   12/2017  Taaghol et al.
(Continued)

OTHER PUBLICATIONS

International Search Report and Written Opinion mailed May 25, 2023 in International Application No. PCT/US2023/061586.
(Continued)

*Primary Examiner* — Brian S Roberts
(74) *Attorney, Agent, or Firm* — Knobbe Martens Olson & Bear LLP

(57) ABSTRACT

This application relates to a distributed software-defined network ("DSDN") for dynamically configuring and managing a wireless communication network. A plurality of DSDN nodes are connected to each other via a plurality of communication paths. Each communication path directly connects two DSDN nodes. Each DSDN node can provide DSDN configurations across diverse and disparate networks by normalizing its data plane network traffic through translation and packet encapsulation. Furthermore, the DSDN node can provide an architecture tolerant of network interruptions and network system fluctuations. For example, in the case of any one of the DSDN node's network interruptions from other DSDN nodes, the DSDN can provide network reconfiguration using network configuration rules stored in a control plane of each DSDN node. Therefore, various embodiments can increase network reliability by the multiple nodes within a software-defined network independently managing its control plane in response to changed network conditions.

21 Claims, 18 Drawing Sheets

Related U.S. Application Data continuation of application No. 17/728,655, filed on Apr. 25, 2022, now Pat. No. 11,496,396.

(51) Int. Cl.
*H04L 45/74* (2022.01)
*H04L 69/22* (2022.01)
*H04W 24/02* (2009.01)
*H04W 40/02* (2009.01)

(56) References Cited

U.S. PATENT DOCUMENTS

| | | | |
|---|---|---|---|
| 10,028,167 B2* | 7/2018 | Calin | H04L 47/2483 |
| 10,893,095 B1 | 1/2021 | Taaghol et al. | |
| 11,496,396 B1 | 11/2022 | Kunc et al. | |
| 2017/0085486 A1 | 3/2017 | Chung et al. | |
| 2017/0086191 A1* | 3/2017 | Sipra | H04L 41/0893 |
| 2019/0069187 A1 | 2/2019 | Ashrafi | |
| 2019/0150150 A1* | 5/2019 | Calin | H04W 72/0453 370/329 |
| 2019/0260714 A1 | 8/2019 | Heo | |
| 2020/0374707 A1 | 11/2020 | Ashrafi | |
| 2022/0021613 A1 | 1/2022 | Venkatasubbaiah et al. | |
| 2022/0368621 A1* | 11/2022 | Simanavicius | H04L 45/121 |

OTHER PUBLICATIONS

Zerrick et al., "Towards a decentralized and adaptive software-defined networking architecture", 2014 International Conference on Next generation Networks and Services (NGNS), 2014, pp. 326-329.

* cited by examiner

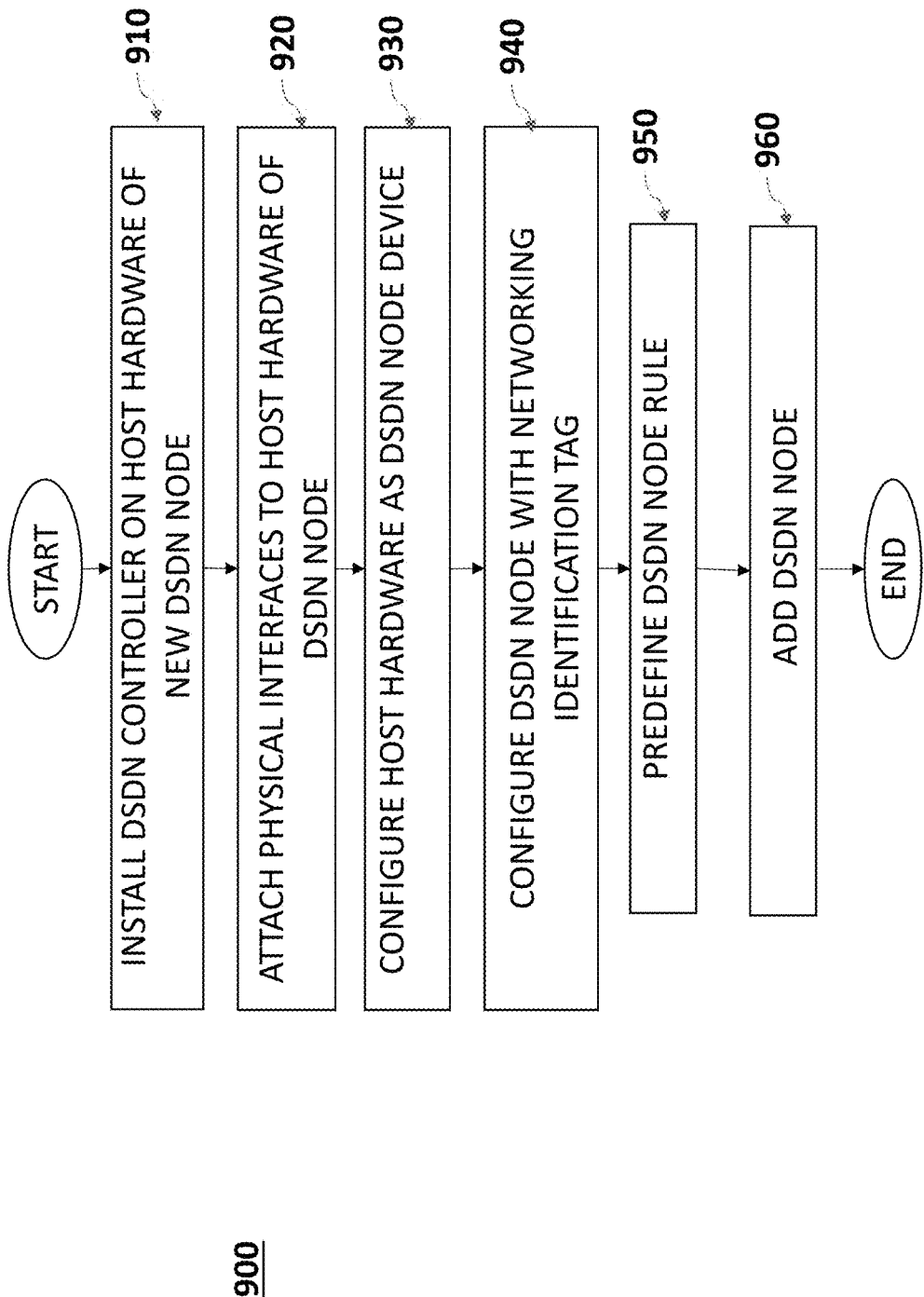

DISTRIBUTED SOFTWARE-DEFINED NETWORK

CROSS-REFERENCE TO RELATED APPLICATIONS

This application is a continuation of U.S. patent application Ser. No. 18/052,144, filed Nov. 2, 2022, which is a continuation of U.S. application Ser. No. 17/728,655, filed Apr. 25, 2022, now U.S. Pat. No. 11,496,396, issued Nov. 8, 2022, the contents of each of which are incorporated by reference herein in their entireties.

This application also relates to and is concurrently filed with U.S. patent application Ser. No. 18/417,885, filed Jan. 19, 2024, the contents of which are incorporated by reference herein in its entirety.

STATEMENT REGARDING FEDERALLY SPONSORED R&D

This invention was made with Government support under contract number FA864921P0926 awarded by the Department of Defense. The Government has certain rights in the invention.

BACKGROUND

Technical Field

The described technology generally relates to a distributed software-defined network ("DSDN") and in particular, to a DSDN system and method for providing software defined network distribution in a wireless communication network.

Description Related Technology

As the demand for the use of wireless communication increases, a variety of wireless communication infrastructure and data link standards are being developed and widely used not only in commercial but also in military applications. To use the infrastructures and data link standards more efficiently, a wireless network robustness in dynamic wireless communication network topologies is required. A software-defined network ("SDN") is a well-known technology in wireless communication networks to provide wireless communication network robustness.

SUMMARY

The embodiments disclosed herein each have several aspects, no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods for processing items in a distribution network.

One aspect is a DSDN system and method for dynamically configuring and managing a wireless communication network to ensure its reliability by providing an architecture that is tolerant of network interruptions and network system fluctuations.

One aspect is a distributed software-defined network (DSDN) system for providing a software defined network distribution in a wireless communication network.

In the above system, the distributed software-defined network (DSDN) system comprises a plurality of DSDN nodes connected to each other via a plurality of communication paths, each communication path directly connecting two DSDN nodes of the plurality of DSDN nodes, each DSDN node configured to function as a DSDN source node or a destination node, a selected source DSDN node configured to activate only a communication path between the selected source DSDN node and a DSDN destination node and deactivate the remaining communication paths between the selected source DSDN node and the remaining non-DSDN destination nodes, the selected source DSDN node configured to communicate data with the DSDN destination node via the activated communication path.

In the above system, each of the plurality of DSDN nodes comprises a physical layer configured to receive data having a data protocol; a control layer connected to the physical layer and configured to store a plurality of sets of DSDN configuration rules; a data layer separated from the control layer and connected to the physical layer; and a DSDN controller.

In the above system, the DSDN controller is configured to define a standard IP data protocol to be used to communicate data with the other DSDN nodes of the plurality of DSDN nodes; determine whether the data protocol of the received data is the standard IP data protocol; in response to determining that the data protocol of the received data is not the standard IP data protocol, convert the data protocol to the standard IP data protocol; identify a first set of DSDN configuration rules of a DSDN destination node using the control layer based on the plurality of sets of DSDN configuration rules; establish a first communication path with the DSDN destination node by executing the identified first set of DSDN configuration rules using the data layer; and communicate the data having the converted standard IP protocol with the DSDN destination node via the established first communication path.

One aspect is a distributed software-defined network (DSDN) system for providing a software defined network distribution in a wireless communication network comprising a plurality of DSDN nodes.

In the above system, the distributed software-defined network (DSDN) system comprises a DSDN node configured to function as a DSDN source node.

In the above system, the DSDN node comprises a physical layer configured to receive data having a data protocol; a control layer connected to the physical layer and configured to store a plurality of sets of DSDN configuration rules; a data layer separated from the control layer and connected to the physical layer; and a DSDN controller.

In the above system, the DSDN controller is configured to define a standard IP data protocol to be used to communicate data with the other DSDN nodes of the plurality of DSDN nodes; determine whether the data protocol of the received data is the standard IP data protocol; in response to determining that the data protocol of the received data is not the standard IP data protocol, convert the data protocol to the standard IP data protocol; identify a first set of DSDN configuration rules of a DSDN destination node using the control layer based on the plurality of sets of DSDN configuration rules; create a first set of communication paths between the DSDN node and the DSDN destination node based on the first set of DSDN configuration rules; establish a first communication path with the DSDN destination node by executing the identified first set of DSDN configuration rules using the data layer; and communicate the data having the converted standard IP protocol with the DSDN destination node via the established first communication path.

In the above system, further comprising an additional DSDN node, storing a plurality of sets of DSDN configuration rules, configured to designate a second DSDN destination node from the plurality of DSDN nodes; identify a second set of DSDN configuration rules of the second DSDN destination node based on the plurality of sets of DSDN configuration rules stored in the additional DSDN node; establish a second communication path with the second DSDN destination node by executing the identified second set of DSDN configuration rules; and communicate data with the second DSDN destination node via the established second communication path.

In the above system, the activated communication path between the selected DSDN source node and the DSDN destination node is an optimal communication path, between the selected source DSDN node and the DSDN destination node, wherein the optimal communication path is configured to be determined based on a quality of the activated communication path.

In the above system, the DSDN controller further comprises a translation driver and a DSDN operational module, wherein the translation driver is configured to extract and duplicate header information of the received data, wherein the DSDN operational module is configured to insert an additional packet into the received data, and wherein the additional packet comprises one or more of a DSDN source node, a destination node, a data payload, and an additional data traffic management policy.

In the above system, to convert the data protocol to the standard IP data protocol, the DSDN controller is configured to: extract and duplicate header information of the received data; populate the header information; insert the header information into a standard OP packet; insert the header information as a data payload; and send the received data to the DSDN destination node.

Another aspect is a defined network distribution in a wireless communication network comprising a plurality of DSDN nodes, the system comprising: a DSDN node configured to function as a DSDN source node, the DSDN node comprising: a physical layer configured to receive data having a data protocol; a control layer connected to the physical layer and configured to store a plurality of sets of DSDN configuration rules; a data layer separated from the control layer and connected to the physical layer; and a DSDN controller.

In the above system, the DSDN controller is configured to define a standard IP data protocol to be used to communicate data with the other DSDN nodes of the plurality of DSDN nodes; determine whether the data protocol of the received data is the standard IP data protocol; in response to determining that the data protocol of the received data is not the standard IP data protocol, convert the data protocol to the standard IP data protocol; identify a first set of DSDN configuration rules of a DSDN destination node using the control layer based on the plurality of sets of DSDN configuration rules; create a first set of communication paths between the DSDN node and the DSDN destination node based on the first set of DSDN configuration rules; establish a first communication path with the DSDN destination node by executing the identified first set of DSDN configuration rules using the data layer; and communicate the data having the converted standard IP protocol with the DSDN destination node via the established first communication path.

In the above system, the DSDN controller is configured to activate the second communication path by deactivating the first communication path.

In the above system, to identify the first set of DSDN configuration rules of the DSDN destination node, the DSDN controller is configured to: calculate the first communication path between the DSDN node and first neighboring nodes of the DSDN node, wherein each of the first neighboring nodes is directly connected to the DSDN node via a communication path; calculate the second communication path between the DSDN node and second neighboring nodes of the DSDN node, wherein each of the second neighboring nodes is directly connected to one of the first neighboring nodes via a communication path; and obtain the first set of DSDN configuration rules of the DSDN destination node from at least one of the first communication path or the second communication path.

In the above system, when the DSDN controller does not obtain the first set of DSDN configuration rules of the DSDN destination node from the first or the second communication path, the DSDN controller is configured to calculate a third communication path between the DSDN node and third neighboring nodes of the DSDN, wherein each of the third neighboring nodes is directly connected to one of the second neighboring nodes via a communication path.

In the above system, the DSDN controller further comprises a translation driver and a DSDN operational module, wherein the translation driver is configured to extract and duplicate header information of the received data, wherein the DSDN operational module is configured to insert an additional packet into the received data, and wherein the additional packet comprises one or more of a DSDN source node, a destination node, a data payload, and an additional data traffic management policy.

In the above system, to convert the data protocol to the standard IP data protocol, the DSDN controller is configured to: extract and duplicate header information of the received data; populate the header information; insert the header information into a standard IP packet; insert the header information as a data payload; and send the received data to the DSDN destination node.

Another aspect is a method of providing a distributed software-defined network (DSDN) in a wireless communication network comprising a plurality of DSDN nodes.

In the above method, the method of providing a distributed software-defined network (DSDN) in a wireless communication network comprising plurality of DSDN nodes comprises providing a DSDN node configured to function as a DSDN source node, the DSDN node comprising a physical layer configured to receive data having a data protocol, a control layer connected to the physical layer and configured to store a plurality of sets of DSDN configuration rules, a data layer separated from the control layer and connected to the physical layer, and a DSDN controller; defining, at the DSDN controller, a standard IP data protocol to be used to communicate data with the other DSDN nodes of the plurality of DSDN nodes; determining, at the DSDN controller, whether the data protocol of the received data is the standard IP data protocol; in response to determining that the data protocol of the received data is not the standard IP data protocol, converting, at the DSDN controller, the data protocol to the standard IP data protocol; identifying, at the DSDN controller, a first set of DSDN configuration rules of a DSDN destination node using the control layer based on the plurality of sets of DSDN configuration rules; creating, at the DSDN controller, a first set of communication paths between the DSDN node and the DSDN destination node based on the first set of DSDN configuration rules; establishing, at the DSDN controller, a first communication path with the DSDN destination node by executing the identified first set of DSDN configuration rules using the data layer; and communicating, at the DSDN controller, the data having the converted standard IP protocol with the DSDN destination node via the established first communication path.

The above method further comprises analyzing, at the DSDN controller, a quality of each of the first set of communication paths between the DSDN node and the DSDN destination node, wherein the quality comprises one or more of cost, bandwidth, latency, link aggregation, or redundancy of the first set of communication paths.

The above method further comprises selecting a second communication path from the first set of communication paths; detecting network interruption of the first communication path; comparing qualities of the first set of communication paths; and selecting the second communication path having the highest quality out of the first set of communication paths.

In the above method, to identify the first set of DSDN configuration rules of the DSDN destination node, the method further comprises calculating the first communication path between the DSDN node and first neighboring nodes of the DSDN node, wherein the first neighboring nodes is directly connected to the DSDN node via a communication path; calculating the second communication path between the DSDN node and second neighboring nodes of the DSDN node, wherein each of the second neighboring node is directly connected to one of the first neighboring node via a communication path; and obtaining the first set of DSDN configuration rules of the DSDN destination node from at least one of the first communication path or the second communication path.

In the above method, when the DSDN controller does not obtain the first set of DSDN configuration rules of the DSDN destination node from the first or the second communication path, further comprising: calculating a third communication path between the DSDN node and third neighboring nodes of the DSDN node, wherein each of the third neighboring nodes is directly connected to one of the second neighboring node via a communication path.

The above method further comprises monitoring the first communication path between the DSDN source node and the DSDN destination node based on one or more of cost, bandwidth, latency, link aggregation, or redundancy of an optimal communication path; detecting a network interruption of the first communication path; creating a second set of communication paths between the DSDN source node and the DSDN destination node, wherein the creating the second set of communication paths include creating all of the communication paths between the DSDN source and the DSDN destination node; analyzing a quality of the each of the second set of communication paths between the DSDN source node and the DSDN destination node based on the one or more of cost, bandwidth, latency, link aggregation, or redundancy; selecting a second communication path between the DSDN source node and the DSDN destination node based on the analyzed result of the quality of each of the second set communication paths between the DSDN source node and the destination node; deactivating the remaining ones of the second set communication paths between the DSDN source node and the DSDN destination node; and transporting data from the DSDN source node to the DSDN destination node using the second communication path.

Another aspect is a non-transitory computer readable medium storing instructions, when executed by one or more processors, configured to perform a method of providing a distributed software-defined network (DSDN) in a wireless communication network comprising plurality of DSDN nodes, the method comprising: providing a DSDN node configured to function as a DSDN source node, the DSDN node comprising a physical layer configured to receive data having a data protocol, a control layer connected to the physical layer and configured to store a plurality of sets of DSDN configuration rules, a data layer separated from the control layer and connected to the physical layer, and a DSDN controller; defining, at the DSDN controller, a standard IP data protocol to be used to communicate data with the other DSDN nodes of the plurality of DSDN nodes; determining, at the DSDN controller, whether the data protocol of the received data is the standard IP data protocol; in response to determining that the data protocol of the received data is not the standard IP data protocol, converting, at the DSDN controller, the data protocol to the standard IP data protocol; identifying, at the DSDN controller, a first set of DSDN configuration rules of a DSDN destination node using the control layer based on the plurality of sets of DSDN configuration rules; creating, at the DSDN controller, a first set of communication paths between the DSDN node and the DSDN destination node based on the first set of DSDN configuration rules; establishing, at the DSDN controller, a first communication path with the DSDN destination node by executing the identified first set of DSDN configuration rules using the data layer; and communicating, at the DSDN controller, the data having the converted standard IP protocol with the DSDN destination node via the established first communication path.

Any of the features of an aspect is applicable to all aspects identified herein. Moreover, any of the features of an aspect is independently combinable, partly or wholly with other aspects described herein in any way, e.g., one, two, or three or more aspects may be combinable in whole or in part. Further, any of the features of an aspect may be made optional to other aspects. Any aspect of a method can comprise another aspect of a system for distributed software-defined network ("DSDN"). Furthermore, any aspect of a DSDN system can be configured to perform a method of another aspect. Furthermore, any aspect of a method can comprise another aspect of a DSDN system. Moreover, any aspect of a DSDN system can be configured to perform a method of another aspect.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIG. 9 is a process flow diagram of a network infrastructure function to add a new DSDN node to an existing DSDN according to some embodiments.

DETAILED DESCRIPTION

Figure 1:
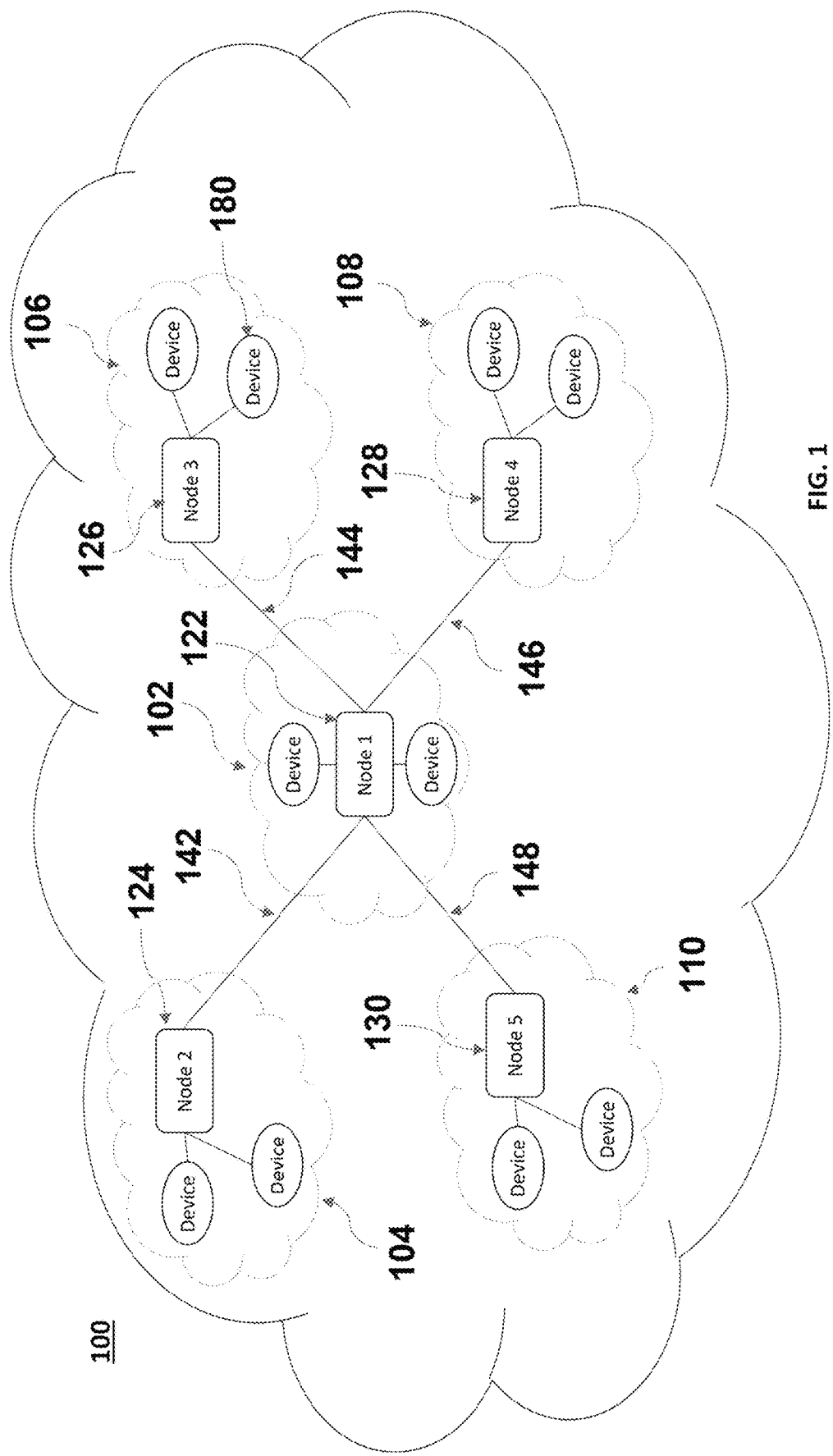
FIG. 1 shows an example of a software-defined network (SDN) configuration.

Provided herein are various embodiments of systems and methods for dynamically configuring and managing a wireless communication network in a distributed software-defined network ("DSDN"). Embodiments described herein include a DSDN system for providing a software-defined network distribution in a wireless communication network. For example, a plurality of DSDN nodes is connected to each other via a plurality of communication paths, each of which directly connects two DSDN nodes. Each DSDN node can provide DSDN configurations across diverse and disparate networks by normalizing its data plane network traffic through translation and packet encapsulation. Furthermore, the DSDN node can provide an architecture tolerant of network interruptions and network system fluctuations. When any DSDN node is interrupted by one or more of the other DSDN nodes or disconnected from the DSDN, the DSDN can provide a network reconfiguration using network configuration rules stored in a control plane of each DSDN node. For example, one DSDN node within the DSDN can be interrupted, causing a malfunction, or can be disconnected from other DSDN nodes. In this example, the DSDN can reconfigure the network to remove the DSDN node. Once the DSDN node recovers its functionality or connectivity, the DSDN can reconfigure the network to add the DSDN node. Therefore, various embodiments can increase network reliability by the multiple nodes within a software-defined network independently managing its control plane in response to changed network conditions.

A software-defined network ("SDN") employs a network architecture, where the architecture can be programmed using software applications. The SDN architecture is based on a centralized network. A central node within the SDN can configure an efficient network configuration to improve the SDN performance. The central node can have a SDN controller (hereinafter to be interchangeably used with a "master SDN controller node"). In the SDN, generally, the master SDN controller node can be programmed to manage the entire SDN. For example, the master SDN controller node can make a data routing decision, forward a data packet to its destination node, or reconfigure a network configuration by adding or removing a node.

An SDN is based on reliable network infrastructures and static topologies requiring constant connectivity to the master SDN controller node. For example, the SDN requires that the master SDN controller node connects to all other nodes within the SDN. The entire SDN is disconnected if the master SDN controller node is disconnected from other nodes due to changing network environments and range limitations. Thus, SDNs are inefficient to use in a variety of disparate and dynamic network topologies. Furthermore, an SDN is not a robust network, so it can be problematic and inoperable in a dynamic network environment found in IoT, military, space, or other ad-hoc applications. Accordingly, there is a need for systems and methods for dynamically configuring and managing a wireless communication network in a distributed software-defined network ("DSDN").

In the following detailed description, reference is made to the accompanying drawings, which form a part hereof. In the drawings, similar symbols typically identify similar components unless context dictates otherwise. Thus, in some embodiments, part numbers may be used for similar components in multiple figures, or part numbers may vary from figure to figure. The illustrative embodiments described in the detailed description, drawings, and claims are not meant to be limiting. Some embodiments may be utilized, and other changes may be made without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification do not necessarily all refer to the same embodiment, nor are separate or alternative embodiments necessarily mutually exclusive. Various features are described herein, which may be exhibited by some embodiments and not by others. Similarly, various requirements are described, which may be requirements for some embodiments but may not be requirements for other embodiments.

As described in detail herein, aspects of the present disclosure relate to a distributed software-defined network ("DSDN") configuration and in particular, to a system and method for dynamically configuring and managing a wireless communication network in a DSDN. The DSDN has an architecture that can be executed on a variety of network processing architectures, such as general-purpose processors or field-programmable gate arrays. The DSDN can ensure its robustness and reliability by providing an architecture that is tolerant of network interruptions and network system fluctuations.

Aspects of the present disclosure provide a technical solution to the SDN caused by a centralized network, where a master SDN controller node controls the entire SDN. More specifically, aspects of the present disclosure relate to reducing interdependency between the master SDN controller node and other nodes. In DSDN, the control and data planes of the individual DSDN node can be logically separated.

Each DSDN node may include a DSDN controller. The DSDN controller may control a control plane of the DSDN node. The DSDN controller can manage the DSDN node's configuration such as adding or removing another DSDN node. The DSDN controller also can add or remove its DSDN node to or from another DSDN node. The DSDN controller can dynamically reconfigure the DSDN node's configuration in response to any network environment change. For example, suppose a DSDN node is disconnected from the remaining DSDN nodes in the DSDN system due to a range limitation. In that case, the DSDN node's DSDN controller can reconnect the DSDN node to one of the neighboring DSDN nodes, so the DSDN node is seamlessly connected to the DSDN network. The DSDN controller may translate a variety of data formats into a standard IP protocol to be communicated within the DSDN. The DSDN controller may optimally route data across the DSDN to a DSDN destination node calculating the communication path quality, including, but not limited to, path cost, bandwidth, latency, link aggregation, redundancy, and so on, where the DSDN controller monitors the factors in real-time.

The control plane of each DSDN node generally includes one or more control plane components distributed across and implemented by one or more control servers. The control plane components are typically implemented on separate servers and may be responsible for network configuration rules. While the data plane represents the movement of user data through the distributed computing system, the control plane can represent the movement of control signals through the distributed computing system. The control plane may also include network control information including, but is not limited to, configuration rules, a function for data packet conversion, or data packet routing rules, etc.

The DSDN node can be configured to normalize data plane network traffic through translation and packet encapsulation. The DSDN may use a standard IP data protocol to communicate data with other DSDN nodes within the DSDN. However, each DSDN node may receive various types of data formats from at least one device connected to the DSDN node. The DSDN controller may translate the various formats, and data packets within the formats may be encapsulated into a standard IP format. The translated and encapsulated data formats can be used across a variety of data link standards and network infrastructures. Thus, the DSDN can provide wireless communication across diverse and disparate networks.

A control plane on each DSDN node can be configured to allow a new DSDN node to be connected to or to communicate data with the existing DSDN. The new DSDN node may include network identification tags. The identification tags may include IP addresses for control and data planes of the DSDN node; a unique DSDN node identification; the DSDN node authentication information; or the DSDN node permissions. Once the new DSDN node is allowed by at least one of the existing DSDN nodes, the new DSDN node can join the DSDN by automatically organizing itself into an appropriate network topology.

Each DSDN node may intelligently route data to a DSDN destination node across the DSDN based on real-time network availability or reliability status. The intelligent routing data can be accomplished by each DSDN node, where a DSDN controller within each of the DSDN nodes is configured to share control information with one or more neighboring DSDN nodes. In some embodiments, each DSDN node shares the control information with a first neighboring DSDN node, where the first neighboring DSDN node is connected in one hop. In another embodiment, each DSDN node shares the control information with a second neighboring DSDN node, where the second neighboring DSDN node is connected in two hops. The number of hops for sharing control information with neighboring DSDN nodes may be defined based on the DSDN resiliency. In some embodiments, the number of the hops is calculated by each DSDN controller based on the quality of the communication paths.

FIG. 1 shows an example of a software-defined network ("SDN") (100). For the purpose of convenience and brevity, five nodes or five sub-networks are presented in FIG. 1. However, the number of nodes/sub-networks within the SDN can be more than or less than five based on specific applications. The SDN (100), as shown in FIG. 1, includes five sub-networks (102), (104), (106), (108), and (110). Each sub-network can include a node and at least one device. Each node is configured to receive information from the device. The node can be the host hardware of the sub-network. Each of the nodes (122, 124, 126, 128, and 130) may include one or more devices or an interface communicating data with one or more devices external to the corresponding node. For example, node 3 (126) can include a device 180. The device can include a sensor, a mobile device, a computer, an internet on thing (IoT) device, an avionics system, a server, a terminal, a modem, or a wide area network (WAN). The device is not limited to any of the example devices described above and can be determined based on a particular application.

As shown in FIG. 1, the SDN (100) is based on a centralized network architecture. Under the centralized network architecture, the SDN (100) includes a master sub-network (102). The master sub-network (102) may include a node 1 (122). The node 1 (122) may be a master SDN controller node of the SDN (100). The SDN (100) is based on reliable network infrastructure and static topology, requiring all of the remaining nodes 2-5 (124, 126, 128, and 130) constantly connected to the master SDN controller node (122). Thus, the master SDN controller node (122) must always be connected to the nodes 2-5 (124-130) via respective communication paths (142, 144, 146, and 148).

The centralized network architecture within the SDN (100) may cause inefficient bandwidth use, because the communication paths (142, 144, 146, and 148) are always established and remain established regardless of the uses of the communication paths.

The SDN (100) is inefficient to use in a variety of dynamic networks topologies. As shown in FIG. 1, the node 1 (122) controls the entire SDN (100). For example, in order that the node 5 (130) sends data to any one of the other nodes (124, 126, and 128), the node 1 (122) first needs to receive the data via the communication path (148) from the node 5 (130) and transmit the received data to other nodes. Thus, if any node is disconnected from the master node 1 (122), the disconnected node cannot communicate data with any of the other nodes (124, 126, 128, and 130) within the SDN (100). In addition, if the node 1 (122) is disconnected from the other nodes (124, 126, 128, and 130), the entire SDN (100) is deactivated. The disconnection can cause a communication path deactivation or failure. A communication path between two nodes can be deactivated in a modern wireless communication system due to network environment changes or range limitations.

The SDN (100) is inefficient for other reasons. The SDN (100), as shown in FIG. 1, requires that the communication paths (142, 144, 146, and 148) have the same data link or data format. For example, if the node 1 (122) can only process a satellite communications datalink (SATCOM) data format, the communication paths (142, 144, 146, and 148) must be a SATCOM data link. Thus, the SDN does not support disparate networks compatibility.

Figure 2:
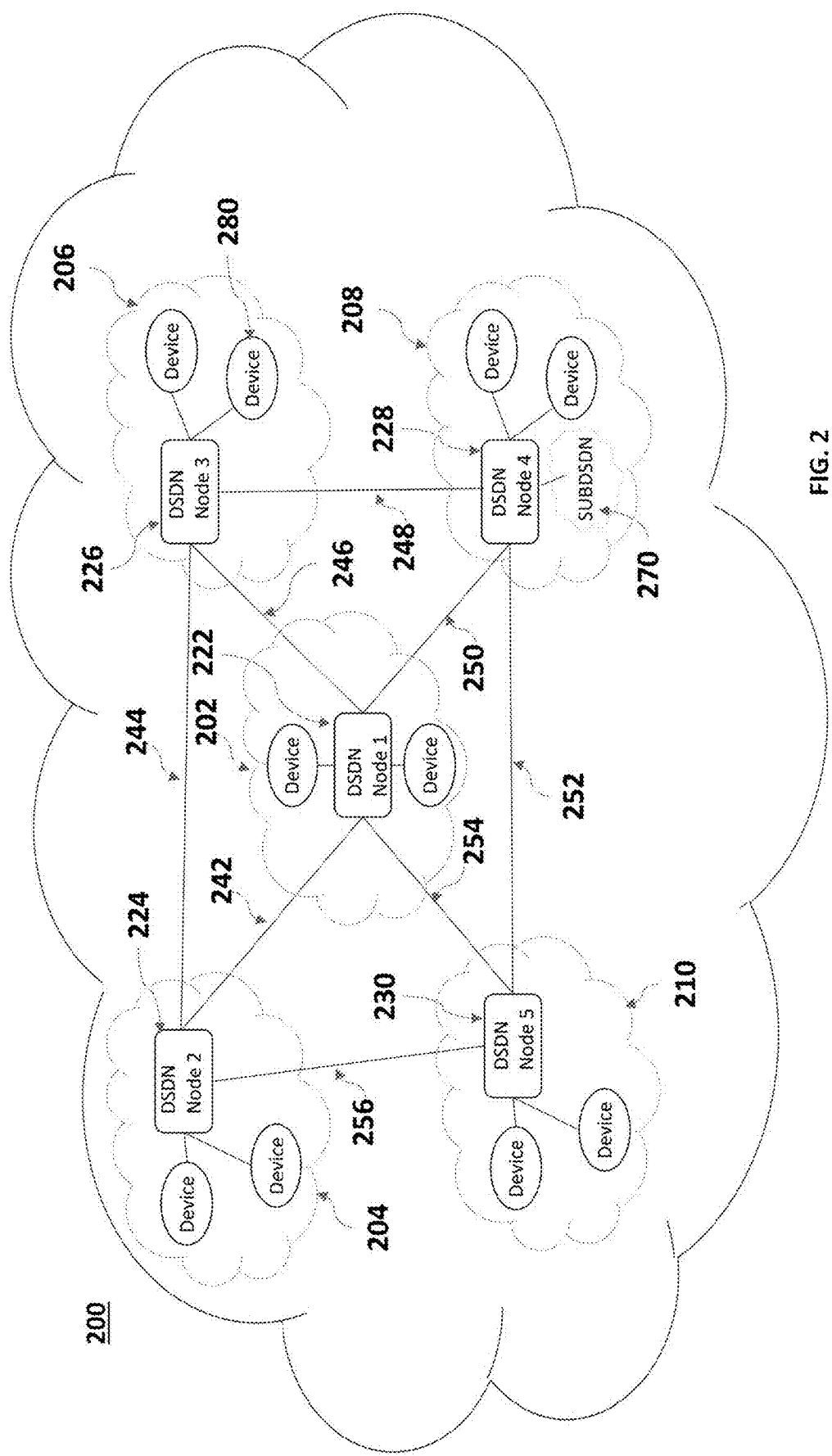
FIG. 2 shows an example of a distributed software-defined network (DSDN) configuration according to some embodiments.

FIG. 2 shows an example of a distributed software-defined network ("DSDN") (200) according to some embodiments. For the purpose of convenience and brevity, the number of nodes or sub-networks in FIG. 2 is five. However, the present disclosure is not limited thereto. For example, the number of nodes/sub-networks can be more than or less than five and can be determined based on specific applications. As shown in FIG. 2, the DSDN (200) includes DSDN sub-networks (202, 204, 206, 208, and 210). The DSDN sub-networks (202, 204, 206, 208, and 210) respectively include DSDN nodes (222, 224, 226, 228, and 230) and at least one device (280). The device (280) can be part of each DSDN node or can be separately provided and connected to an interface of the DSDN node. The device can include a sensor, a mobile device, a computer, an internet on thing (IoT) device, an avionics system, a server, a terminal, a modem, or a wide area network (WAN). The device is not limited to any of the example devices described above and can be determined based on a particular application.

Although FIG. 2 shows that each DSDN sub-network includes two devices, the present disclosure is not limited thereto. For example, each DSDN sub-network may include or be connected to one device, or three or more devices. Furthermore, at least two of the DSDN sub-networks may include different numbers of devices. Each DSDN node can be configured to receive data from the device. A DSDN node can communicate data with one or more of the remaining DSDN nodes in the DSDN 200. Although FIG. 2 shows only one DSDN (200), the present disclosure is not limited thereto. For example, two or more DSDNs may be provided, and these two more DSDNs may communicate data with each other.

As shown in FIG. 2, each DSDN node is connected to nearby DSDN nodes. For example, DSDN node 1 (222) is directly or indirectly connected to DSDN nodes 2-5 (224, 226, 228, and 230), via communication paths (242, 244, 246, 248, 250, 252, 254, and 256). In some embodiments, a DSDN node is connected to neighboring DSDN nodes within more than one hop. For example, as shown in FIG. 2, the DSDN node 2 (224) is connected to the first nearby DSDN nodes (222, 226, and 230) with one hop via a communication path (242, 244, and 256, respectively). In some embodiments, a DSDN node can connect to its neighboring DSDN nodes with two hops via two communication paths. For example, the DSDN node 2 (224) can be connected to DSDN node 3 (226) with two hops via two communication paths (242 and 246). The number of hops in connecting two DSDN nodes can be defined based on specific applications and DSDN status.

Each DSDN node (222, 224, 226, 228, and 230) can include a DSDN controller (not shown in FIG. 2). The DSDN controller can manage the control plane of each DSDN node network architecture, where the control and data planes are logically separated. In the DSDN node network architecture, the control plane generally includes one or more control plane components distributed across and implemented by one or more control servers. The control plane components are typically implemented on separate servers and may be responsible for network configuration rules. While the data plane represents the movement of user data through the distributed computing system, the control plane can represent the movement of control signals through the distributed computing system. The DSDN controller can store configuration rules and/or define a standard IP data protocol to be used to communicate data with the other DSDN nodes. The DSDN controller can also determine whether the data protocol of the received data is the standard IP data protocol in response to determining that the data protocol of the received data is not the standard IP data protocol and/or convert the data protocol to the standard IP data protocol.

In various embodiments, the DSDN (200) is compatible with disparate networks. A DSDN controller within each DSDN node (222, 224, 226, 228, and 230) can convert a variety of data formats into a standard IP protocol. Thus, any data format within a DSDN sub-network (202, 204, 206, 208, or 210) can be first converted into a standard IP data format. Then, the DSDN controller can send a standard IP data format to another or other DSDN nodes using communication paths. For example, suppose the DSDN sub-network (204) is using a SATCOM datalink. In that case, the DSDN controller in the DSDN node 2 (224) can convert the SATCOM data into a standard IP format and transmit it to DSDN node 5 (230) via a communication path (256), where the DSDN sub-network (210) may use a different data link such as an RF data link. Thus, even though the DSDN sub-networks (204, 210) use different data links, the DSDN sub-networks (204, 210) can communicate data with each other via the communication path (256).

In various embodiments, the DSDN (200) can be easily adapted to changing network conditions such as network interruptions and network system fluctuations. For example, even if a communication path (244) is deactivated, the DSDN node 2 (224) and the DSDN node 3 (226) can still be connected to each other through other communication paths (242 and 246) and the DSDN node 1 (222). Further, even if the communication path (246) is also deactivated, the DSDN node 2 (224) and the DSDN node 3 (226) can still be connected through other communication paths (242, 248, 250, 252, 254, and/or 256) and DSDN node 1 (222), DSDN node 4 (228), and/or DSDN node 5 (230). Each DSDN node can automatically determine an optimized communication path. The DSDN controller in the DSDN node may optimally route data across the DSDN to a DSDN destination node based on one or more factors of path cost, bandwidth, latency, link aggregation, redundancy, etc., where the DSDN controller monitors the factors in real-time. In some embodiments, the DSDN nodes can be dynamically grouped or ungrouped based on the factors or network conditions.

In various embodiments, at least one of the DSDN sub-networks (202, 204, 206, 208, or 210) may include a SUBDSDN (270). For example, as shown in FIG. 2, the DSDN sub-network (208) includes a SUBDSDN (250). The SUBDSDN 270 can be connected to other DSDN nodes, e.g., to the DSDN node 3 (226) via the communication path (248) or the DSDN node 5 (230) via the communication path (252). The SUBDSDN 270 can be a local physical group system that directly connected to a DSDN node. For example, if an airplane is a DSDN node and connected to a DSDN, internal computers inside the airplane, where the internal computers are physically connected each other, can be the SUBDSDN 270.

Figure 3:
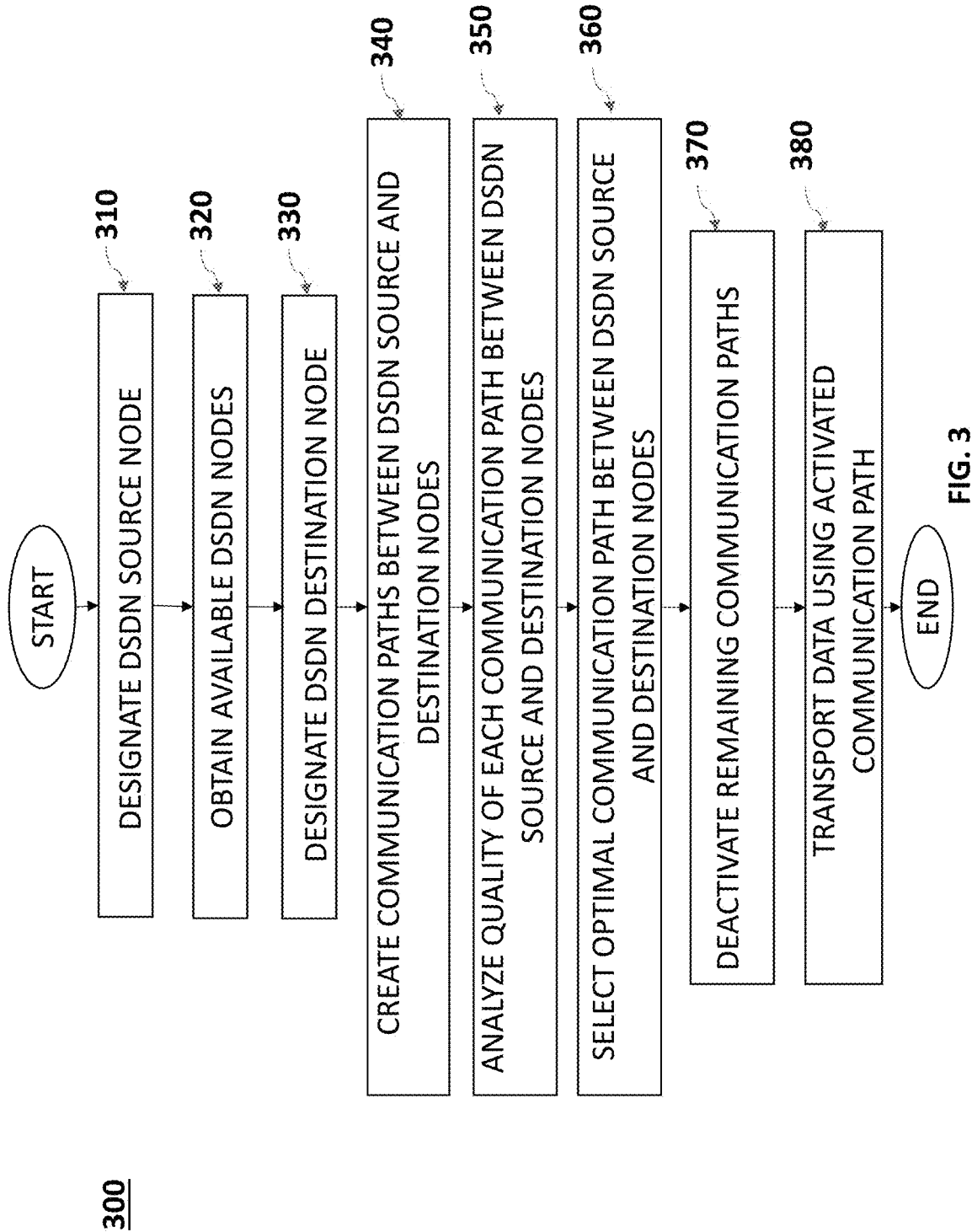
FIG. 3 is a process flow diagram of a communication method between two DSDN nodes according to some embodiments.

FIG. 3 is a process flow diagram (300) of a method for communicating between two DSDN nodes according to some embodiments. The two DSDN nodes may include first and second DSDN nodes. The process flow diagram 300 may be implemented by a DSDN controller within each DSDN node. In FIG. 3, an optimized routing communication path can be established using two or more communication paths depending on the DSDN connectivity environment. FIG. 3 is merely an example process flow diagram for communicating between two DSDN nodes, and certain states may be removed, other states added, two or more states combined, or one state can be separated into multiple states depending on the specification and requirements. For the purpose of convenience, the description will be made based on the DSDN controller performing or causing at least part of the process flow diagram 300 of FIG. 3 by referring to the DSDN of FIG. 2.

In state 310, a DSDN controller can designate a first DSDN node as a DSDN source node. The DSDN controller may belong to the first DSDN node or the second DSDN node that communicates data with the first DSDN node. The DSDN controller may cause the first DSDN node to be designated as the DSDN source node, for example, based on an input from a user or operator of the DSDN node, or based on the DSDN system data routing information. The designation as the DSDN source node also can be predefined based on a set order or "vote" for which DSDN node should be a main controller similar to clusters.

In state 320, the DSDN controller may obtain all available DSDN nodes. In some embodiments, the available DSDN nodes are nodes that are directly (connected within one hop) or indirectly (connected within two or more hops) connected to the DSDN source node. For example, as shown in FIG. 2, if the DSDN node 2 (224) is a designated DSDN source node, then the DSDN node 1 (222), the DSDN node 3 (226), and the DSDN node 5 (230) may be available DSDN nodes because these nodes are directly connected to the DSDN node 2 (224) respectively via the communication paths 242, 244, and 256. The DSDN node 4 (228) is also an available node because the DSDN node 4 (228) is indirectly connected to the DSDN node 2 (224) via at least one communication path (two or more hops). In some embodiments, the DSDN node 2 (224) can define a rule such that the maximum hop is one. In such embodiments, the available nodes are the DSDN node 1 (222), DSDN node 3 (226), and DSDN node 5 (230) because these nodes are connected to the DSDN node 2 (224) via respective communication paths (242, 244, and 256).

In state 330, the DSDN controller may designate a DSDN destination node. The DSDN controller of the designated DSDN source node can designate the DSDN destination node. The DSDN destination node is a node that receives data from the DSDN source node. In some embodiments, the DSDN destination node is designated among available DSDN nodes determined, for example, in state 310.

In state 340, the DSDN controller may create communication paths between the DSDN source node and destination node. In some embodiments, two or more communication paths are created. For example, between DSDN node 2 (224) and DSDN node 4 (228), at least five available communication paths can be created, e.g., via the communication paths (244, 248); via the communication paths (242, 250); via the communication paths (256, 252); via the communication paths, (242, 246, 248); and via the communication paths (256, 254, 250).

In state 350, the DSDN controller in the DSDN source node can analyze the quality of the communication paths created between the DSDN source node and DSDN destination node. In some embodiments, the quality of communication paths can be determined based on one or more factors of path cost, bandwidth, latency, link aggregation, or redundancy, where the DSDN node DSDN controller monitors the factors in real-time.

In state 360, the DSDN controller in the DSDN source node can select an optimal communication path between the DSDN source node and the DSDN destination node. In some embodiments, the optimal communication path can include a plurality of communication paths. In some embodiments, the DSDN source node can dynamically change the optimal communication path based on one or more of the factors described above or network conditions.

In some embodiments, the optimized communication path can be automatically determined by each available DSDN node. The DSDN controller in the DSDN node may optimally route data across the DSDN to the DSDN destination node based on one or more factors of path cost, bandwidth, latency, link aggregation, or redundancy, etc., where the DSDN controller monitors the factors in real-time. In some embodiments, the DSDN nodes can be dynamically grouped or ungrouped based on the factors or network conditions.

In state 370, the DSDN controller may deactivate or cause remaining communication paths other than the optimal communication path between the DSDN source node and DSDN destination node to be deactivated. The deactivation can be advantageous, as it can efficiently use the frequency bandwidth. For example, if an optimized communication path between the DSDN node 5 (230) and DSDN node 4 (228) is via the communication paths (254, 250), the communication paths (252, 256, 248, 254, 250) can be deactivated. Thus, bandwidth does not have to be assigned to the deactivated communication paths while the DSDN node 5 (230) is communicating data with the DSDN node 4 (228) via the communication paths (254, 250).

In state 380, the DSDN controller of the DSDN source node can transport data to the DSDN destination nodes via the activated communication path. In some embodiments, the activated communication path is an optimized communication path.

In some embodiments, the optimized communication path can be changed while the DSDN source and destination nodes are communicating data with each other. In such embodiments, the change of the optimized communication path can be determined based on several factors, including (but not limited to) path cost, bandwidth, latency, link aggregation, redundancy, and so on, where the DSDN controller monitors the factors in real-time. The DSDN controller in the DSDN source node monitors the optimized communication path in the embodiments. When the DSDN controller detects any communication path interruption or decreasing performance, such as path cost, bandwidth, latency, link aggregation, redundancy, and so on, the DSDN controller can create a second set of communication paths between the DSDN source node and the DSDN destination node. The second set of communication paths may include all the communication paths between the DSDN source and the DSDN destination node. Then, a second optimal communication path between the DSDN source node and the DSDN destination node can be determined using the states 340-360 of FIG. 3. The DSDN controller of the DSDN source node can transport data using the second optimal communication path following the states 370 and 380 of FIG. 3.

Figure 4:
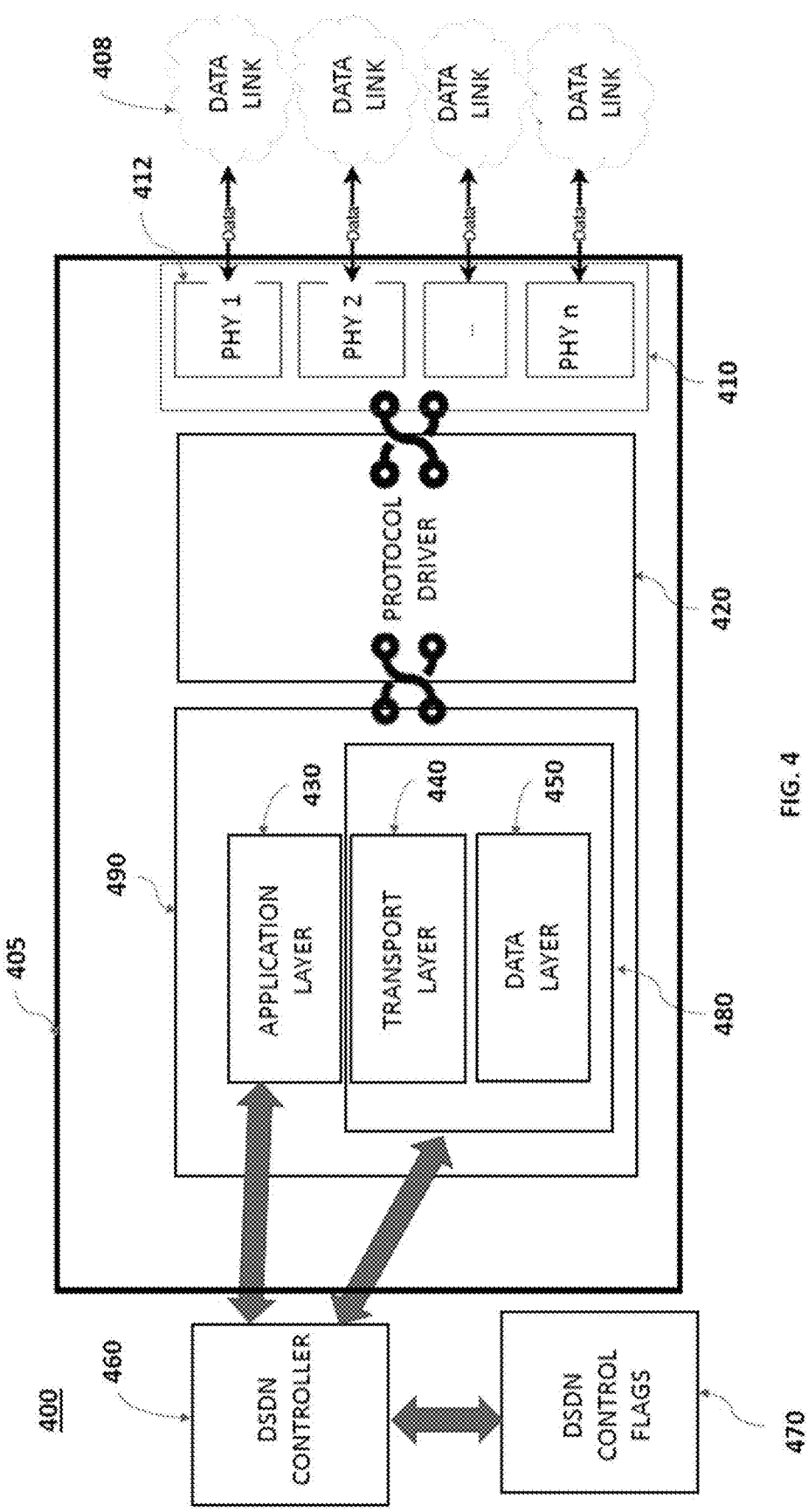
FIG. 4 is a block diagram of a DSDN node network architecture according to some embodiments.

FIG. 4 is a block diagram of an example DSDN node network (400) according to some embodiments. The DSDN node network (400) shown in FIG. 4 is merely an example network, and certain elements may be modified or removed, two or more elements combined into a single element, and/or other elements or equipment may be added. The DSDN node network (400) may include a physical layer (410), a protocol driver (420), an application layer (430), a transport layer (440), a data layer (450), a DSDN controller (460), and DSDN control flags (470). In some embodiments, the physical layer (410), the protocol driver (420), the application layer (430), the transport layer (440), and a data layer (450) are integrated as a network system layer (405).

In some embodiments, the control flags (470) are embedded in the network traffic headers and are extracted by the DSDN controller (460). In these embodiments, the application layer (430), the transport layer (440), and the data layer (450) can be the DSDN nodes' operating network functions and stacks that are modified by the controller's instructions. For example, the application layer (430) could be an application on DSDN node that buffers the information on a hard drive to avoid interruptions causing a loss of data. The data layer (450) function can be updating routing tables in the DSDN node to create a new optimal path for example.

In some embodiments, the application layer (430), the transport layer (440) and a data layer (450) can be a DSDN operating network (490). The DSDN operating network (490) can be modified by the DSDN controller. For example, the application layer (430) could be an application on a DSDN node that buffers information stored in storage to avoid interruptions, causing a loss of data. The data layer (450) can update routing information in the DSDN node to reconfigure the DSDN such as by creating a new optimal path. In some embodiments, the transport layer (440) and the data layer (450) can be formed as an operating system (480). The application layer (430) may include an application programming interface (API) that can communicate with a software program such as kill chains, storage management, firewall, compression, file server, video streaming, web browsing, encryption libraries, virtual private networks, etc. These programs are merely examples, and the present disclosure is not limited thereto, and the programs can be determined based on a particular application. The DSDN controller (460) can communicate with the operating system (480) and the application layer (430). For example, the DSDN controller (460) may receive a reconfiguration request from the operating system (480) or the application layer (430) to reconfigure the DSDN. Then, the DSDN controller (460) can reconfigure the DSDN based on the request. After the reconfiguration, the DSDN controller (460) can send the reconfiguration information to the operating system (480) or the application layer (430). In some embodiments, the DSDN controller (460) can share data within the DSDN, where the data can be received from the application layer (430). For example, the application layer (430) may send a new encryption key to the DSDN controller (460), and the DSDN controller (460) can update the DSDN with the new encryption key.

The physical layer (410) defines a data transmission medium. In some embodiments, the physical layer (410) can include one or more physical interfaces (412) to receive or transmit data using a data link (408) from one or more devices. In some embodiments, each physical interface (412) can support different data link types (408). For example, one physical interface can receive a SATCOM data link, and another can receive a Link-16 data link. The number of physical interfaces (412) and data link types can be determined based on a specific application.

The protocol driver (420) can convert data received from the physical interface(s) (410) into a data format suitable for the DSDN. For example, if the physical layer (412) receives, via the data link (408), one or more data having various formats such as serial, Fibre, Channel, or asynchronous transfer mode (ATM), the protocol driver (420) can convert the data format into a data format that can be used in the operating system (480). These various formats are merely examples, and the present disclosure is not limited thereto.

The application layer (430) can support various protocols. The protocols may include, but are not limited to, software-defined network (SDN), VLANs, Kill Chains, Storage, and Firewall. These protocols are merely examples, and the present disclosure is not limited thereto, and the protocols can be determined based on a particular application. In some embodiments, the application layer (430) can be specified based on the internet protocol under TCP/IP model.

The transport layer (440) may be responsible for data delivery within the DSDN. The transport layer (440) can establish a connection between two DSDN sub-networks. In some embodiments, the transport layer (440) securely delivers the data by adding one or more VPN, Proxies, or Authentication protocols. These protocols are merely examples, and the present disclosure is not limited thereto, and the protocols can be determined based on a particular application.

The data/network layer (450) may deliver data to a specific DSDN destination node. The data layer (450) can convert various data formats into a standard IP format using packet parsing, data translation, or encapsulation methods.

The DSDN controller (460) can manage the DSDN node network (400). In some embodiments, the DSDN controller (460) is implemented into each DSDN node. In each DSDN node, the DSDN controller (460) may manage the application layer (430), the transport layer (440), and the data/ network layer (450). In some embodiments, the DSDN controller (460) uses the configuration rules stored in a control layer. In some embodiments, the DSDN controller (460) can include a routing decision engine. In these embodiments, using the configuration rules, the DSDN controller (460) can determine a communication path between two DSDN nodes using the routing decision engine.

The DSDN control flags (470) can configure the DSDN by communicating data within the DSDN. In some embodiments, the control flags (470) can be used to indicate a node's type (controller or just plain data transport), a node's authentication/security level, heartbeat information, timestamps, etc. for controllers to share status type information directly. The DSDN control flags (470) may communicate data with the DSDN controller (460) to configure the DSDN. For example, the DSDN control flags (470) can include the DSDN nodes' information and can provide the information to one or more DSDN nodes. The DSDN node information may include the DSDN nodes' type (such as whether the DSDM node is a controller or data transporter), authentication or security level, heartbeat information, timestamps, etc. These DSDN nodes' information is merely examples, and the present disclosure is not limited thereto.

In some embodiments, the DSDN controller (460) can define a standard IP data protocol to be used to communicate data with the other DSDN nodes. The DSDN controller (460) can also determine whether the data protocol of the received data is the standard IP data protocol in response to determining that the data protocol of the received data is not the standard IP data protocol and convert the data protocol to the standard IP data protocol.

In some embodiments, the control plane of each DSDN node may include a DSDN controller (460). A control plane within the DSDN node network generally includes one or more control plane components distributed across and implemented by one or more control servers. The control plane components can typically be implemented on a separate set of servers and may generate network configuration rules. While the data plane represents the movement of user data through the distributed computing system, the control plane can represent the movement of control signals through the distributed computing system. The DSDN controller can manage the DSDN node's configuration such as adding or removing another DSDN node. The DSDN controller can also add or remove its DSDN node to or from another DSDN node. The DSDN controller can dynamically reconfigure its configuration in response to any network environment change. For example, if a DSDN node is disconnected due to a range limitation, the DSDN controller reconfigures its DSDN node configuration to neighboring DSDN nodes, so the DSDN node is seamlessly connected to the DSDN network. The DSDN controller may translate a variety of data formats into a standard IP protocol to be communicated within the DSDN. The DSDN controller may optimally route data across the DSDN to a DSDN destination node based on several factors, including (but not limited to) path cost, bandwidth, latency, link aggregation, redundancy, and so on, where the DSDN controller monitors the factors in real-time.

Figure 5:
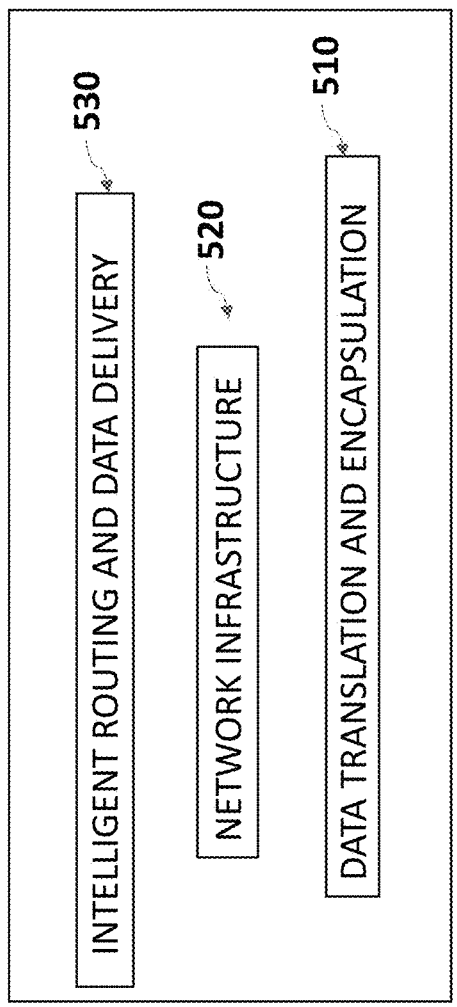
FIG. 5 is a block diagram showing DSDN's main functions according to some embodiments.

FIG. 5 is a block diagram illustrating an example of the DSDN's main functions (500). In some embodiments, each DSDN node can function as a network switch and also a DSDN controller. Each of the DSDN nodes may include a DSDN controller, and the DSDN controller may perform one or more of the following functions: data translation and encapsulation (510); network infrastructure (520); and intelligent routing and data delivery (530). The DSDN's main function block diagram shown in FIG. 5 is merely an example network, and certain elements may be modified or removed, two or more elements combined into a single element, and/or other elements or equipment may be added.

Figure 6:
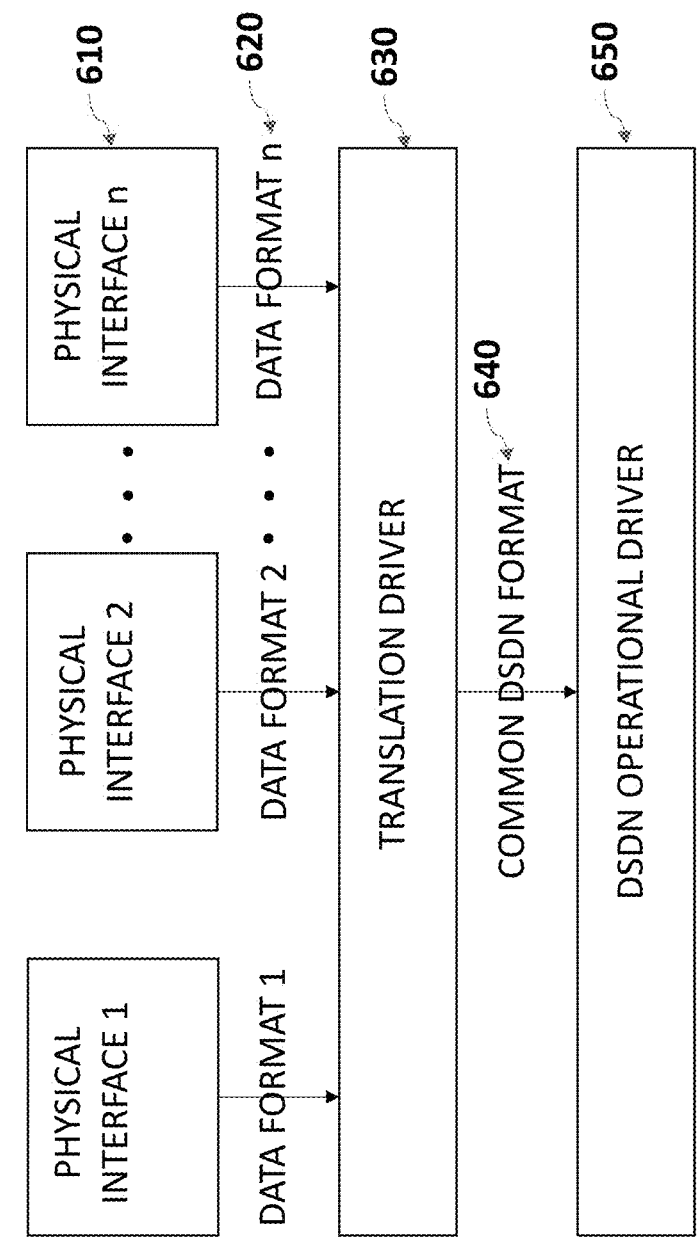
FIG. 6 illustrates a data format translation process of a general data translation and encapsulation according to some embodiments.

FIG. 6 illustrates a data format translation process (600) of a general data translation and encapsulation (510) according to some embodiments. In some embodiments, various data types are received from multiple existing physical interfaces (610). Each data received from the physical interfaces (610) can have different data formats (620). As shown in FIG. 6, the different data formats (620) can be converted into a standard IP format by using, for example, a translation driver (630) and a DSDN operational driver (650). At least one of the translation driver (630) or the DSDN operational driver (650) can be implemented with software.

The translation driver (630) can extract and duplicate header information from the different data formats (620) at a packet by packet-level for a given protocol. After processing the data formats (620) using the translation driver (630), the data formats (620) can be converted into a common DSDN data format (640). The DSDN operational driver (650) may further parse the common DSDN format data (640) by inserting one or more additional information such as DSDN source node, destination node, data payload, or additional data traffic management policy.

Figure 7:
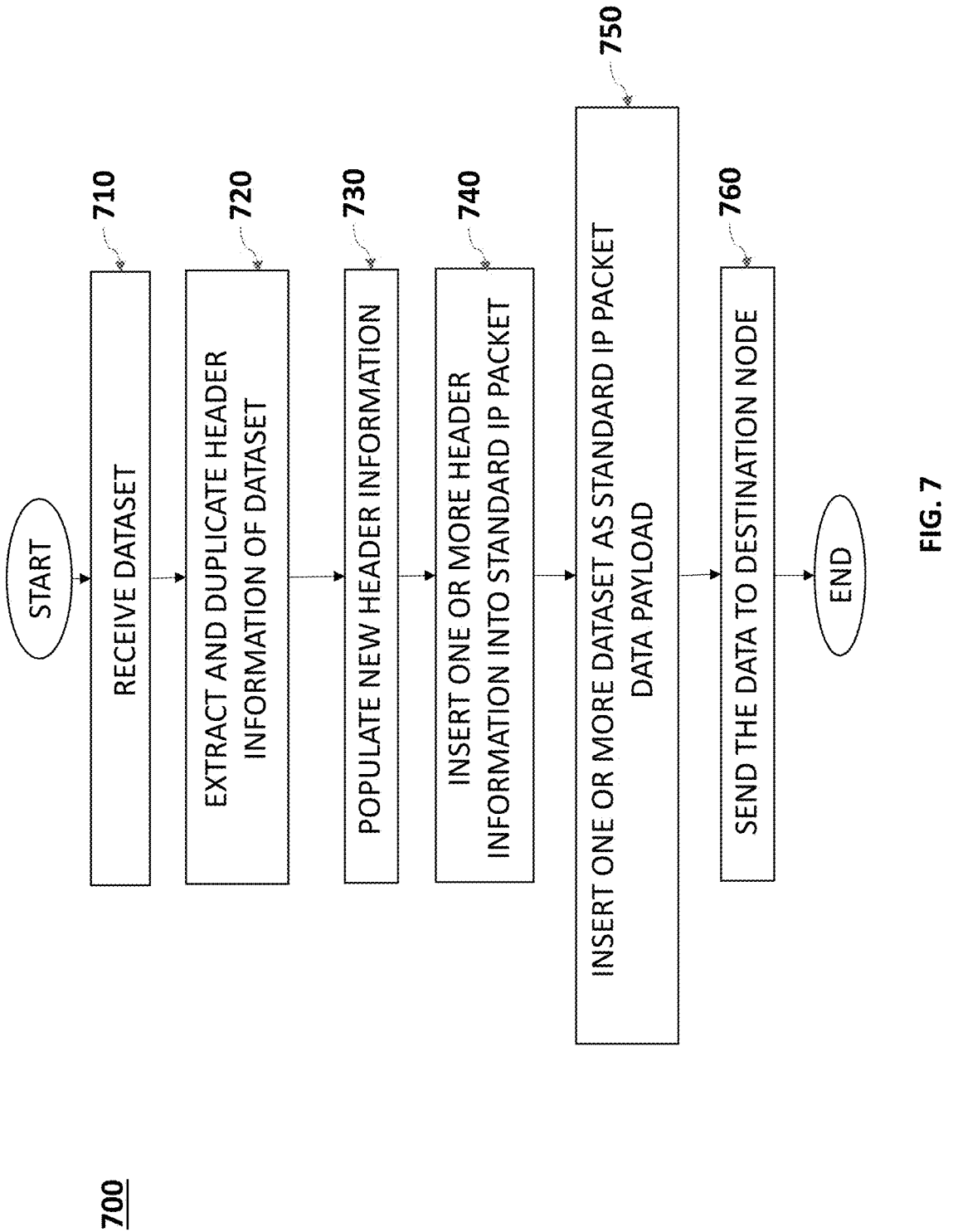
FIG. 7 is a process flow diagram of a method of translating and encapsulating data according to some embodiments.
Figure 8A:
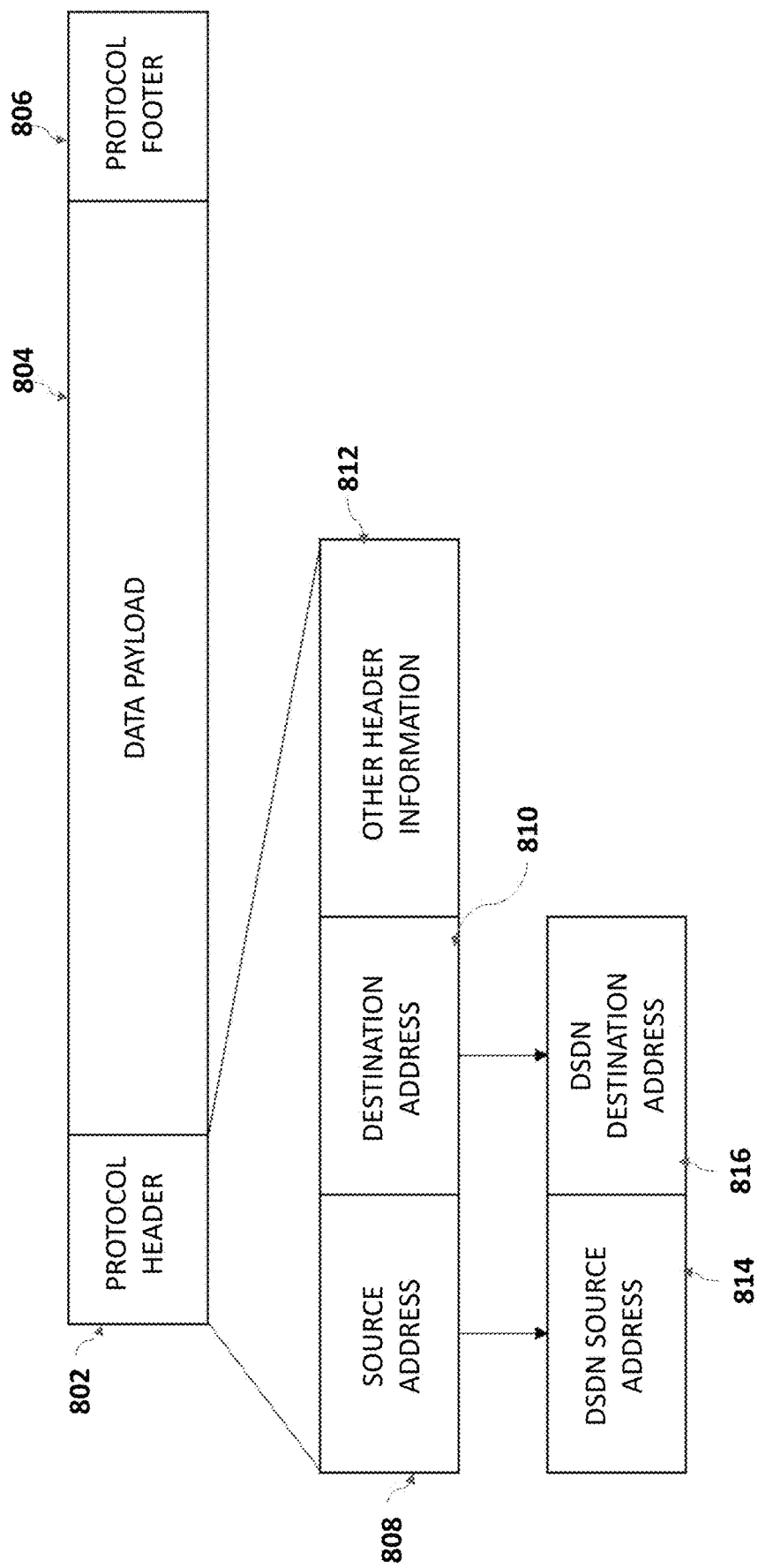
FIGS. 8A-8C show an example of data format conversion processed by a DSDN node according to some embodiments.
Figure 8B:
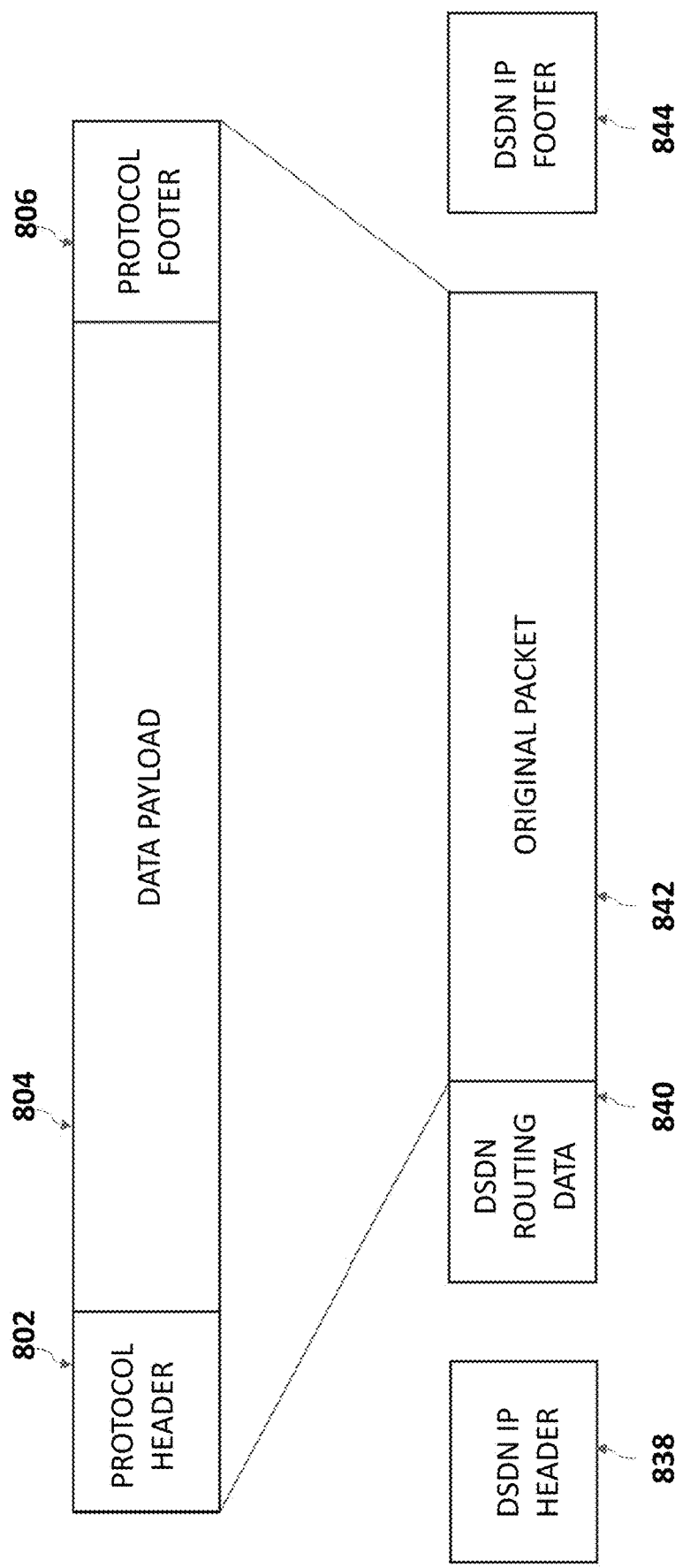
Figure 8C:
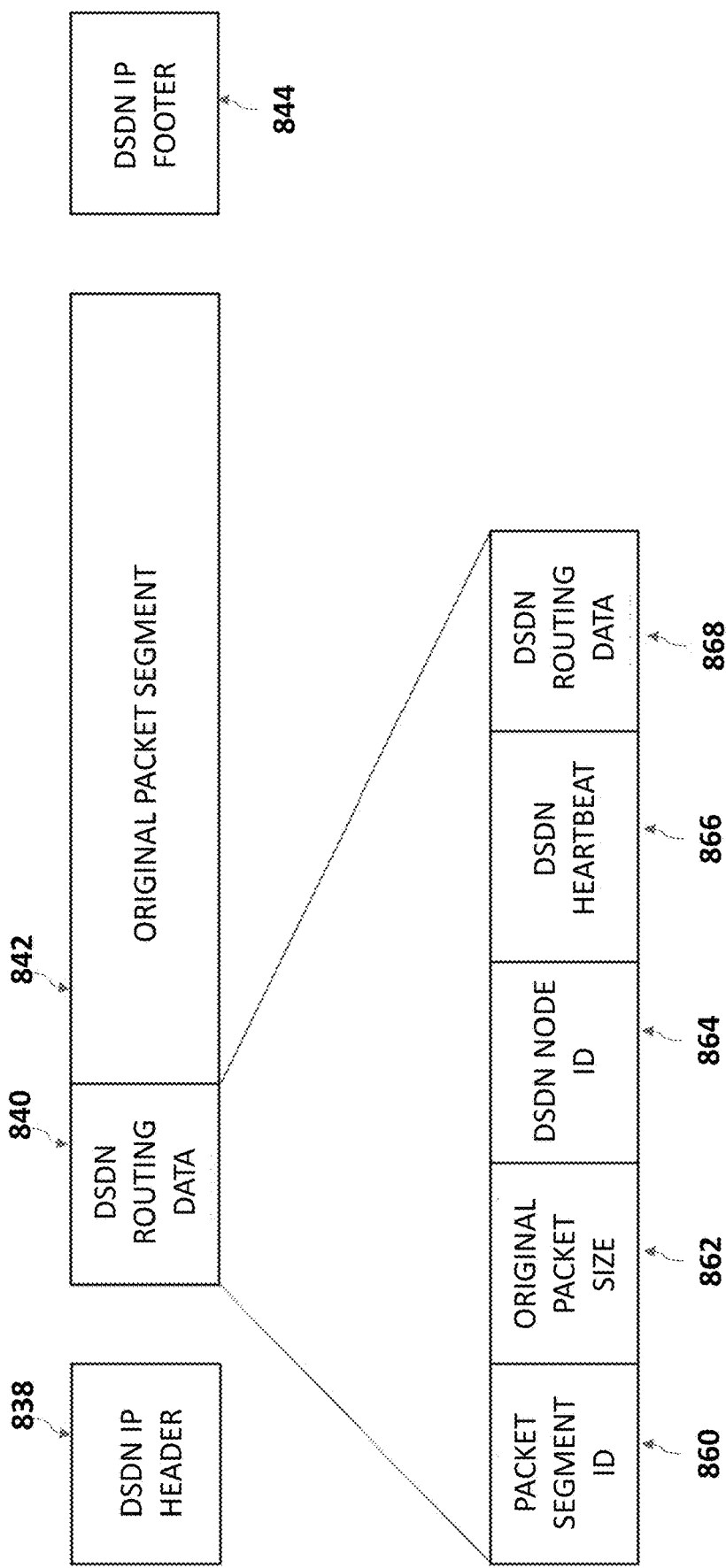

FIG. 7 is a process flow diagram (700) of a method of data translation and encapsulation (510) according to some embodiments. The process flow diagram (700) may be implemented by at least one of the application layers (430), the transport layer (440), the data layer (450), or the DSDN controller (460) (see FIG. 4). FIG. 7 is merely an example process flow diagram for data processing within each DSDN node, and the method can be modified based on application node, and specific data link types. For example, certain states may be removed, other states added, two or more states combined, or one state can be separated into multiple states depending on the specification and requirements. FIGS. 8A-8C are examples of a data format corresponding to a specific state of FIG. 7. FIGS. 8A-8C are merely example data formats, and the present disclosure is not limited thereto. For the purpose of convenience, the description will be made based on the DSDN controller performing or causing at least part of the process flow diagram 700 of FIG. 7 by referring to FIGS. 2, 6, and 8A-8C.

In state (710), the DSDN controller can receive or cause a DSDN node to receive a dataset from multiple devices. For example, as shown in FIG. 2, the DSDN node 3 (226) receives data from one or more devices (280). As shown in FIG. 6, each DSDN node can include a physical interface (610) that receives data from a device. In some embodiments, at least two of the data formats (620) received from each physical interface (610) can be different from each other.

In state (720), the DSDN controller can extract and duplicate or cause the translation driver (630) to extract and duplicate header information of the dataset. For example, the translation driver (630) can convert the various data formats (620) into a standard DSDN format (640). In some embodiments, the DSDN controller (e.g., the DSDN controller (460) shown in FIG. 4) includes the translation driver (630) or can control or cause the translation driver (630) to convert the various data formats (620) into a standard DSDN format (640). For example, as shown in FIG. 8A, the data format (620) can be extracted and duplicated into a data format comprising a protocol header (802), a data payload (804), and a protocol footer (806).

In state (730), the DSDN controller may populate the protocol header (802) information in a newly created DSDN header. As shown in FIG. 8A, for example, the newly created DSDN header may include a source address (808), a destination address (810), and other header information (812). In some embodiments, the source address (808) can be a DSDN source address (814), and the destination address (810) can be a DSDN destination address (816).

In state (740), the DSDN controller can insert one or more header information into a standard IP packet. For example, the DSDN source address (814) and the DSDN destination address (816) may be inserted into a standard IP based packet. As shown in FIG. 8B, the DSDN source address (814) and the destination address (810) can be inserted into a DSDN IP header (838). Thus, the new data format may include a DSDN IP header (838), a DSDN routing data (840), an original packet (842), and a DSDN IP footer (844).

In state (750), the DSDN controller can insert one or more dataset information as a DSDN data payload. For example, as shown in FIG. 8B, the dataset's protocol header (802), the data payload (804), and the protocol footer (806) can be inserted into the DSDN packet (842).

In some embodiments, as shown in FIG. 8C, the DSDN routing data (840) can include one or more fields for a packet segment ID (860), an original packet size (862), a DSDN node ID (864), a DSDN heartbeat (866), and a DSDN routing data (868). This information, the packet segment ID (860), the original packet size (862), the DSDN node ID (864), the DSDN heartbeat (866), and the DSDN routing data (868) can be received from the DSDN control flags (470) (As shown in FIG. 4).

In state (760), the DSDN controller can send the data to a DSDN destination node. In some embodiments, the data can be sent across the DSDN with no additional processing necessary until it returns to the destination end device. At this point, the process may be reversed, and the original packet may be presented to the existing physical interface of the end device.

FIG. 9 is a process flow diagram (900) of a network infrastructure function (520) for adding a new DSDN node to an existing DSDN, according to some embodiments. In a DSDN node, data plane functions may rely on encapsulation of transported data for common sharing of the data across the DSDN with minimal latency and overhead processing. Control plane functions may also rely on the identification of topologically adjacent or neighboring DSDN nodes and sharing of control information with only these neighboring nodes. FIG. 9 is merely an example process flow diagram for adding a new DSDN node, and certain states may be removed, other states added, two or more states combined or one state can be separated into multiple states depending on the specification and requirements. For the purpose of convenience, the description will be made based on the DSDN controller performing or causing at least part of the process flow diagram 900 of FIG. 9.

In state (910), the DSDN controller can be installed on the host hardware of a new DSDN node. In some embodiments, the DSDN controller can be embedded into the new DSDN node network architecture. In one embodiment, the new DSDN node can be a wide area network (WAN). In such embodiment, the new DSDN node may not include a DSDN functionality as shown in FIG. 5.

In state (920), the DSDN controller can attach a physical interface of the new DSDN node to the communications path of at least one of other DSDN nodes. In one embodiment, the communications path can be a WAN or an existing data link.

In state (930), the DSDN controller can configure the host hardware of the connected to function as a DSDN node device.

In state (940), the DSDN controller can configure the DSDN node with an identification tag or address based on shared DSDN configurations, for example.

In state (950), the DSDN controller can predefine the new DSDN node rules, for example, with system authentication information and DSDN permissions. In some embodiments, the authentication schemes can be based on the deployment use case, such as pre-shared key encryption, public key infrastructure handshaking, or no authentication at all. In some embodiments, the DSDN permission may include trust level and priority that can distribute configurations or accept the configurations.

In state (960), the DSDN controller can add the new DSDN node to the existing DSDN. Once configured and deployed, the new DSDN node may automatically organize itself into the appropriate network topology based on the permissions and each node's local network environment. In some embodiments, this can be accomplished by a standard flow link layer discovery protocol (LLDP) or broadcast domain discovery protocol (BDDP).

In some embodiments, when the new DSDN node is deployed into an existing DSDN, the new DSDN node may only initially communicate data with nearby existing DSDN nodes. Thus, adding a new DSDN node may not traverse or otherwise interrupt the entire DSDN.

Figure 10:
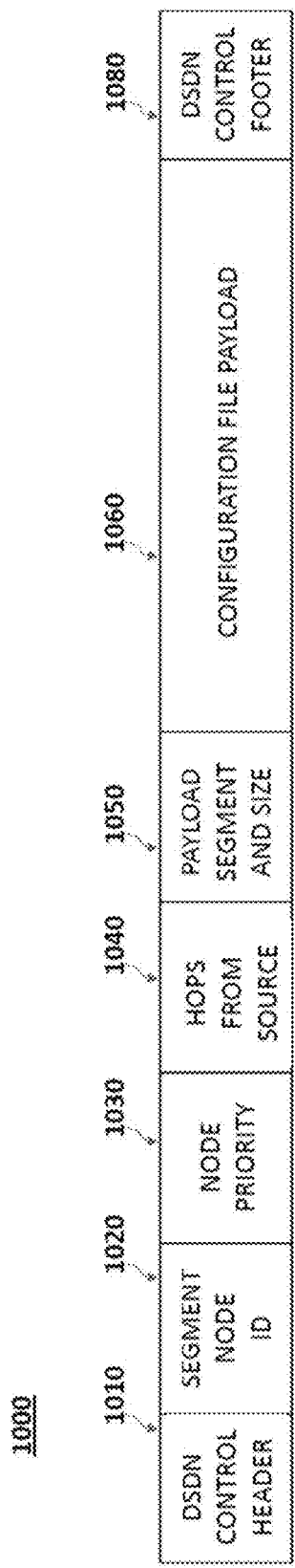
FIG. 10 illustrates an example data format for an initial communication of a new DSDN node according to some embodiments.

FIG. 10 illustrates an example data format (1000) for an initial communication of a new DSDN node according to some embodiments. FIG. 10 is merely an example data format, and the present disclosure is not limited thereto. The data format (1000) may include, but is not limited to, a DSDN control header (1010), a segment node ID (1020), a node priority (1030), a hops from source (1040), a payload segment and size (1050), a configuration file payload (1060), and a DSDN control footer (1080). The DSDN control header (1010) may behave like a standard network traffic header with source, destination, checksum, and other standard IP routing information. In some embodiments, other fields are part of the payload of a standard IP packet and can be used by each DSDN node.

The segment node ID (1020) may represent an address or name associated with a DSDN node for metric reporting.

The node priority (1030) may represent that if multiple configuration commands are received from multiple DSDN nodes that are the same distance away (hops), the node with the highest priority (trust) can be chosen. This value can be used to create element groupings on the fly and can be changed in real-time.

The payload segment and size (1050) may represent that the size is variable since the main payload ranges from DSDN configuration state to metrics reporting. This field can capture the overall payload size and current segment of the payload data.

The hops from source (1040) may represent that when the DSDN is designed for dynamic configuration in response to an interrupted and dispersed network, the DSDN nodes can be individually configured only to pass information with a maximum number of previous hops. The hopping can ensure that the network is not flooded with traffic from multiple nodes sharing redundant information.

Figure 11:
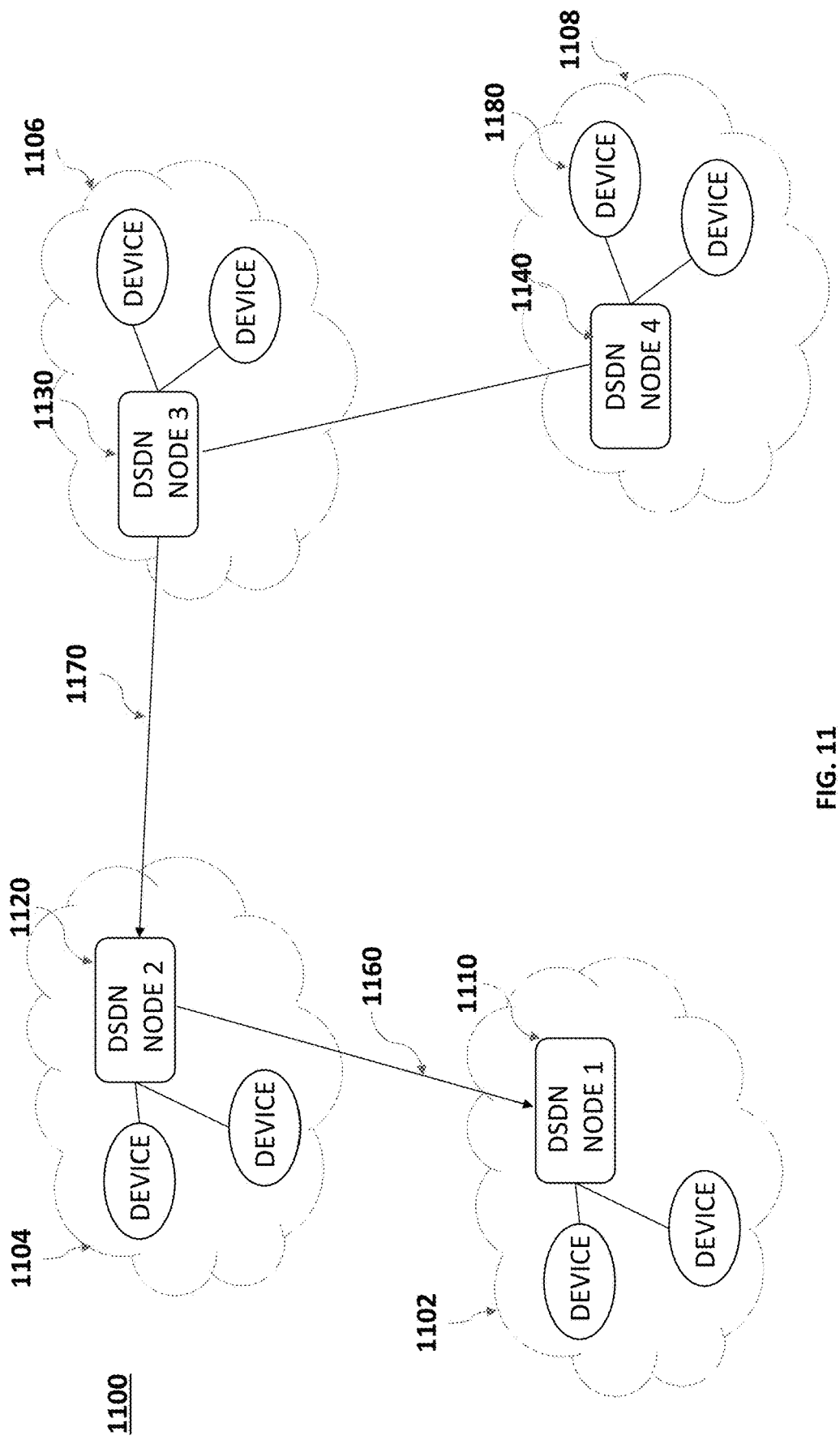
FIG. 11 illustrates an example of a DSDN hopping topology according to some embodiments.

FIG. 11 illustrates an example of a DSDN hopping topology according to some embodiments. As shown in FIG. 11, for example, the DSDN (1100) includes DSDN sub-networks (1102, 1104, 1106, and 1108). Each of the DSDN sub-networks (1102, 1104, 1106, and 1108) includes a DSDN node (1110, 1120, 1130, and 1140, respectively) and at least one device (1180). As an example, the DSDN node 1 (1110) is a DSDN source node, and the DSDN node 3 (1130) contains a "Config A" configuration data. If the DSDN node 1 (1110) has a hopping rule that the maximum hopping is limited to two, the DSDN node 1 (1110) can accept the "Config A" from DSDN Node 3 (1130) via communication paths (1160, 1170). The DSDN node 2 (1120) may pass the "Config A" data to another DSDN node. However, the DSDN node 1 (1110) may not see control information from the DSDN node 4 (1140) because the DSDN node 2 (1120) may discard control data beyond two hops from the DSDN node 1 (1110).

Figure 12:
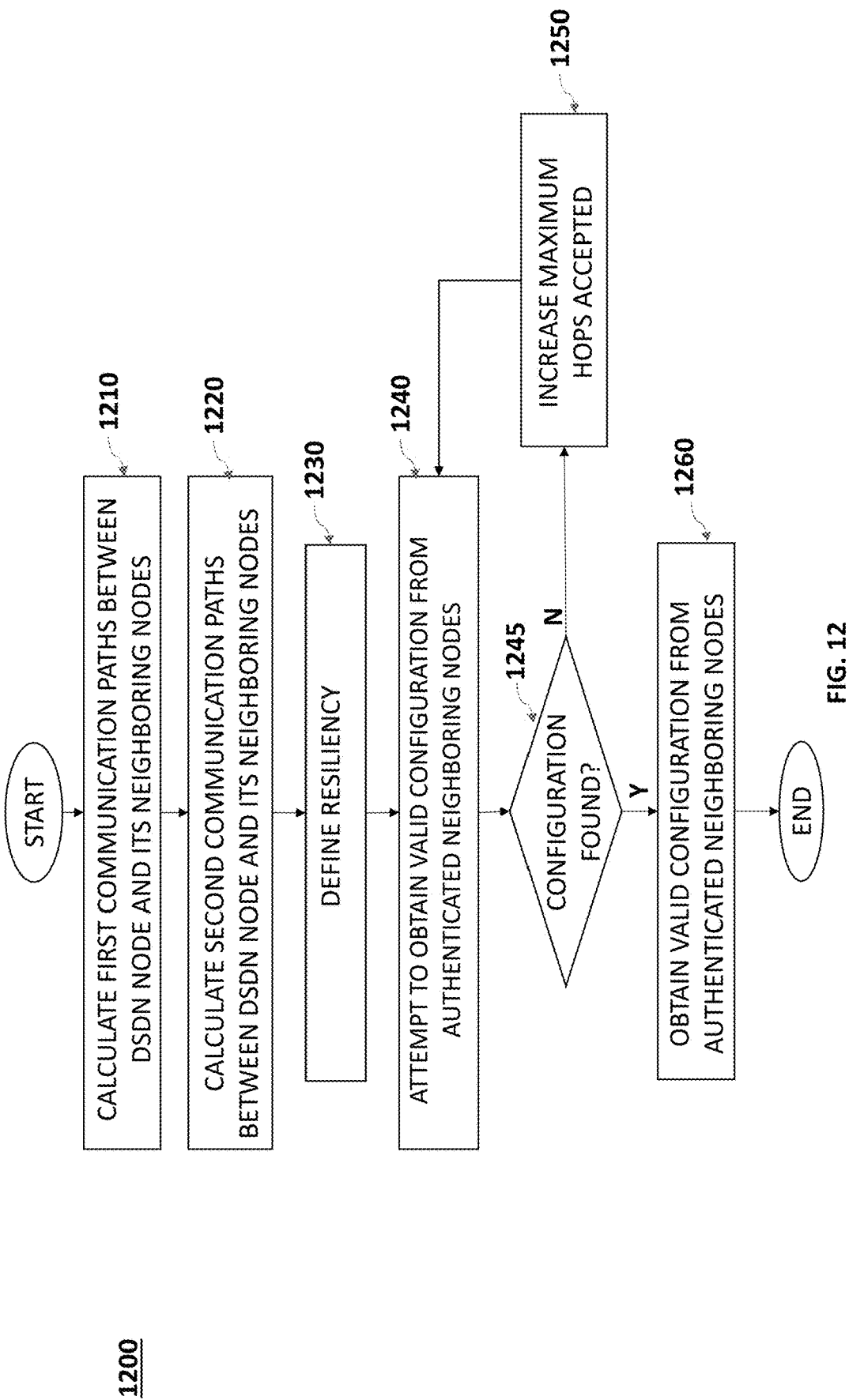
FIG. 12 is a process flow diagram of the intelligent routing and data delivery function to share control information from another DSDN node according to some embodiments.

FIG. 12 is a process flow diagram (1200) of the intelligent routing and data delivery function (530) to share control information from another DSDN node, according to some embodiments. FIG. 12 is merely an example process flow diagram for intelligent routing and data delivery function, and certain states may be removed, other states added, two or more states combined or one state can be separated into multiple states depending on the specification and requirements. Generally, DSDN accounts for network volatility by allowing each DSDN node to maintain an independent SDN domain and share control information with nearby DSDN nodes for cross-network transport of data. Each DSDN node can share control information with nearby DSDN nodes.

Figure 13:
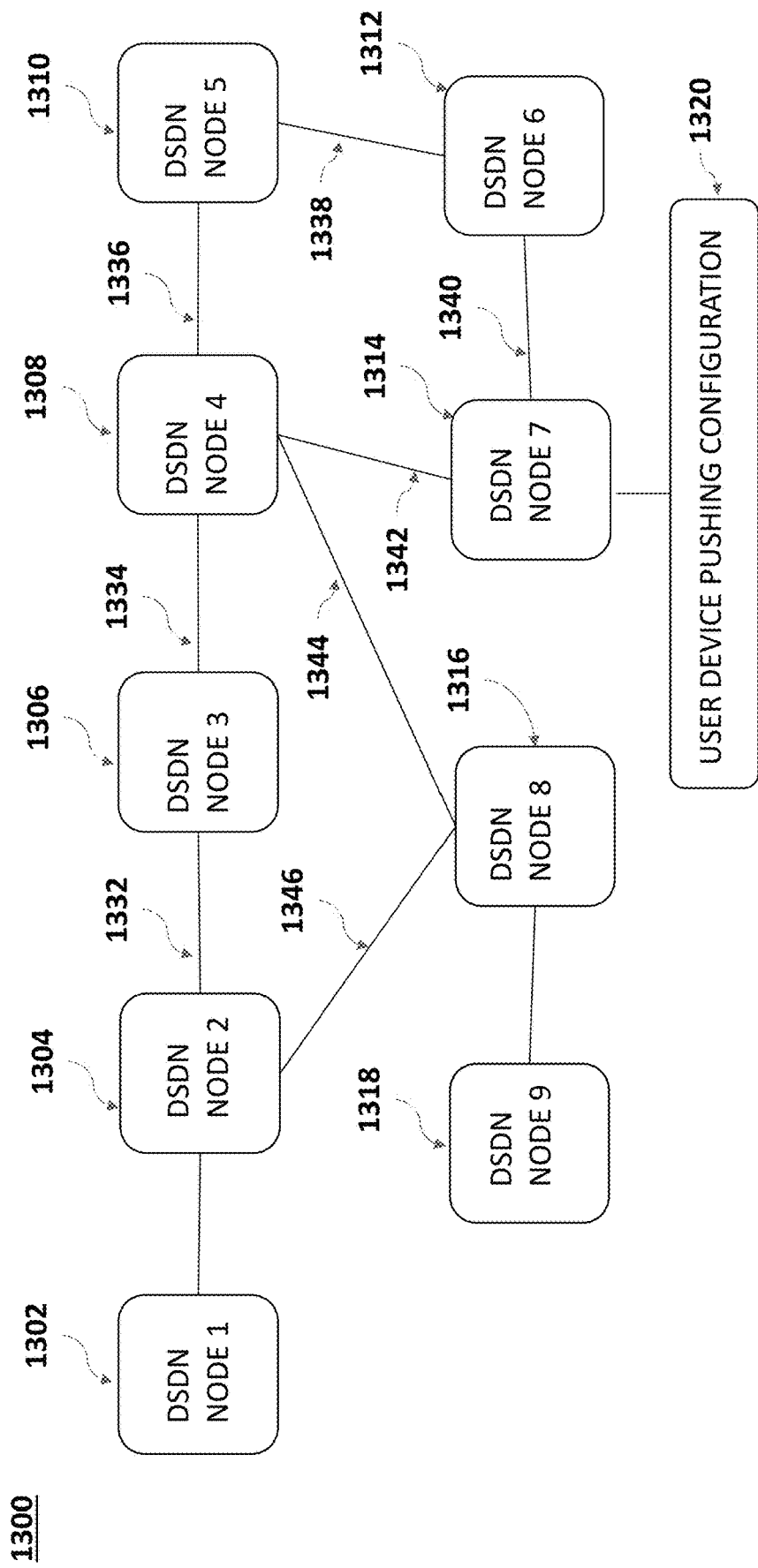
FIG. 13 illustrates an example of a DSDN routing process as shown in FIG. 12 according to some embodiments.

FIG. 13 illustrates an example of a DSDN routing process (1300) as shown in FIG. 12 according to some embodiments. For the purpose of convenience, the description will be made based on the DSDN controller performing or causing at least part of the process flow diagram 1200 of FIG. 12 by referring to the DSDN of FIG. 13.

In state 1210, the DSDN controller may calculate or cause a DSDN node to calculate first communication paths between the DSDN node and its neighboring nodes. The first neighboring nodes may be directly connected to or may directly communicate data with the DSDN node via one communication path to the DSDN node having valid configuration information. For example, as shown in FIG. 13, the DSDN node 7 (1314) includes a piece of valid configuration information such as "user device pushing configuration (1320)." In these embodiments, the first neighboring nodes are the DSDN node 4 (1308) and DSDN node 6 (1312), because these nodes are directly connected to the DSDN node 7 (1314) via one communication path (1342, 1340, respectively).

In state 1220, the DSDN controller may calculate or cause the DSDN node to calculate second communication paths between the DSDN node and its neighboring nodes. The second neighboring nodes may be indirectly connected to or may directly communicate data with the DSDN node via two communication paths to the DSDN node having valid configuration information. For example, as shown in FIG. 13, the DSDN node 7 (1314) includes valid configuration information such as "user device pushing configuration (1320)." In these examples, the second neighboring nodes are the DSDN nodes 5 (1310), DSDN node 3 (1306), and DSDN node 8 (1316). The DSDN node 5 (1310) may be connected to the DSDN node 7 (1314) via two communication paths (1336 & 1342 or 1338 & 1340). The DSDN node 3 (1306) may be connected to the DSDN node 7 (1314) via two communication paths (1334 and 1342). The DSDN node 8 (1316) may be connected to the DSDN node 7 (1314) via two communication paths (1344 and 1342).

In state 1230, the DSDN controller may redefine or cause the DSDN node to define resiliency. In some embodiments, resiliency can be defined by a maximum number of hops.

In state 1240, the DSDN controller may attempt or cause a DSDN node to attempt to obtain valid configuration from authenticated neighboring nodes. For example, as shown in FIG. 13, if the resiliency is defined as two maximum hops, the following DSDN nodes will obtain the "User device pushing configuration (1320)" from the DSDN node 7 (1314): the DSDN nodes 3 (1306); DSDN node 4 (1308); DSDN node 5 (1310); DSDN node 6 (1312); and DSDN node 8 (1316).

In state, 1245 the DSDN controller may determine whether the valid configuration is found. If the DSDN controller determines that the valid configuration is found, the DSDN controller may obtain a valid configuration from authenticated neighboring nodes (state 1260).

If the DSDN controller determines that the valid configuration is not found, the DSDN controller may increase the maximum hops accepted (state 1250). For example, if the DSDN node 9 (1318) needs to obtain the "User device pushing configuration (1320), the maximum hops accepted can be increased until the DSDN node 9 (1318) obtains the "User device pushing configuration (1320)" from the DSDN node 7 (1314). The number of maximum hops allowed in a DSDN can be determined based on topology, network condition, and applications.

In some embodiments, the entire DSDN can share configuration information obtained from a DSDN node by delivering the configuration information in a cascading manner. For example, as shown in FIG. 13, the DSDN node 7 (1314) contains a "user device pushing configuration (1320)". If the maximum hops allowed in the DSDN is three, the DSDN node 2 (1304) and the DSDN node 9 (1318) may receive the "user device pushing configuration," 1320. If the maximum hops allowed in the DSDN is further increased to four, the entire DSDN can share the "user device pushing configuration (1320)" from the DSDN node 7 (1314).

Figure 14:
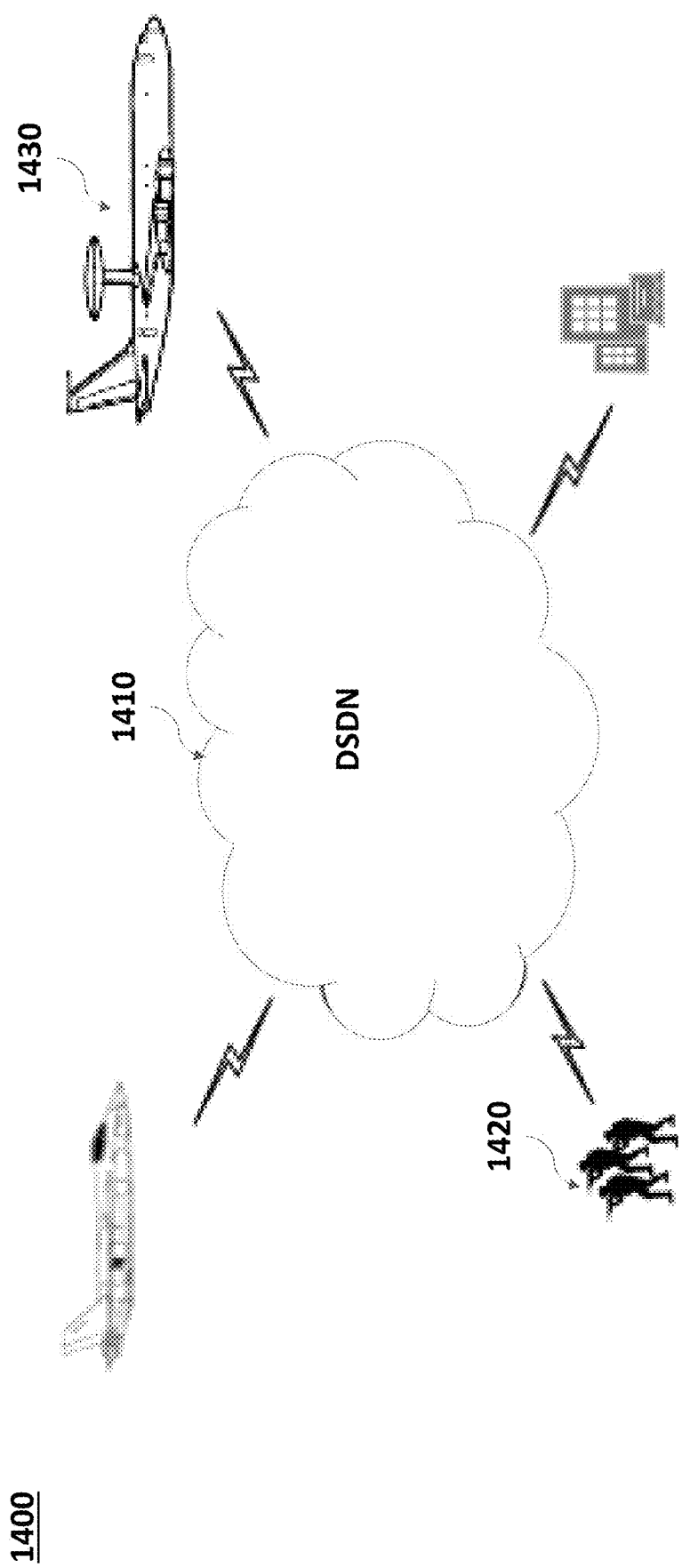
FIG. 14 illustrates an example of the DSDN use case to create an ad-hoc network 1400, where multiple hosts can be connected to the DSDN according to some embodiments.

FIG. 14 illustrates an example DSDN use case to create an ad-hoc network 1400, where multiple hosts can be connected to the DSDN according to some embodiments. As shown in FIG. 14, the DSDN 1410 may be in wireless data communication data with one or more hosts. FIG. 14 is merely an example use case and the present disclosure is not limited thereto. Although FIG. 14 shows four hosts connected to the DSDN 1410, depending on the embodiment, less than or more than four hosts can be connected to the DSDN 1410. The DSDN 1410 may be in wireless data communication data with one or more hosts including a host A (1420) and a host B (1430). The host A (1420) and the host B (1430) can connect to the DSDN (1410). The "host" in this case means any computing system that requires connectivity into the network. This can be a mission computer, avionics, navigation systems, etc. The host can be portable and held by a person such as a soldier shown in FIG. 14. The host A (1420) can create data to be transmitted to the host B (1430). The host A (1420) can also connect to one of DSDN nodes, e.g., a source DSDN node, within the DSDN (1410). The DSDN can then determine a DSDN destination node, where the host B (1430) is connected to the DSDN destination node. The DSDN may create a communication path between the DSDN source node and the destination node using the processing steps as shown in FIG. 3. The DSDN controller within the DSDN source node may convert the data into a standard IP protocol using the processing steps as shown in FIG. 7. The DSDN may route the data to the DSDN destination node using the hopping process shown in FIG. 12. According to some embodiments, the use case example of FIG. 14 can allow for any host having a DSDN controller to create a DSDN or join to an existing DSDN. This provides reconfigurable sub-networks and data channels linking different end-users that otherwise cannot be grouped without DSDN.

Figure 15:
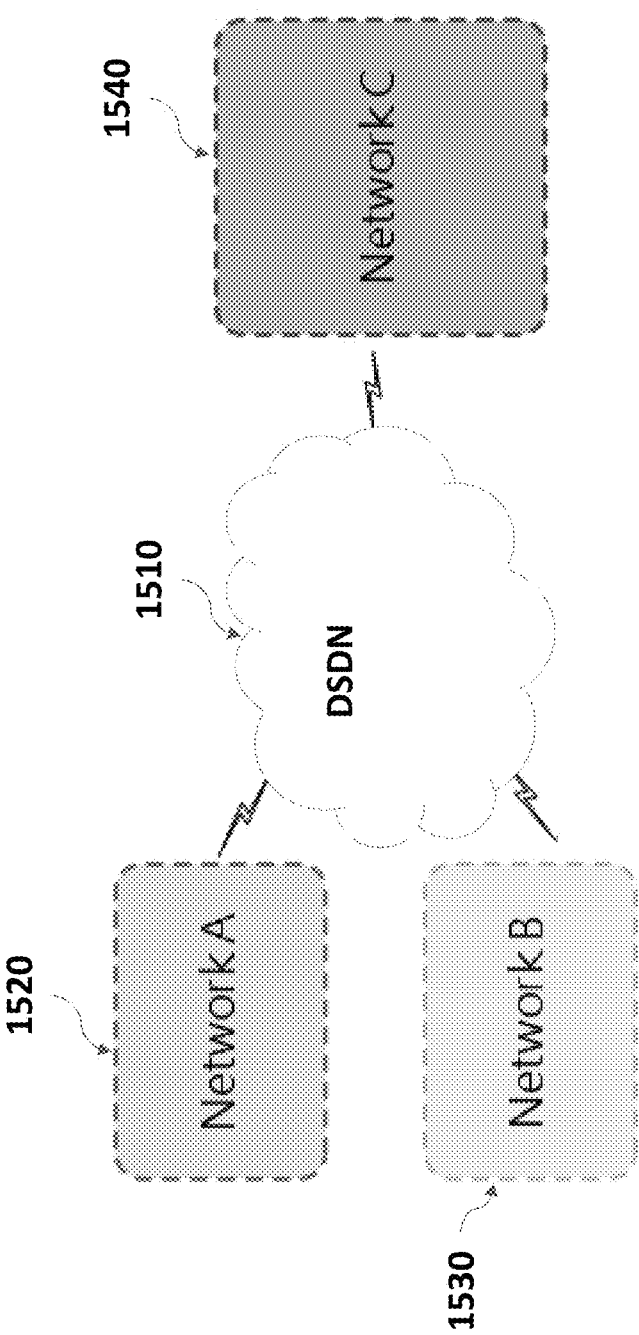
FIG. 15 illustrates an example of the DSDN use case that can connect different types of networks according to some embodiments.

FIG. 15 illustrates another example DSDN use case that can connect to different types of networks 1500 according to some embodiments. As shown in FIG. 15, the DSDN 1510 may be in wireless data communication data with one or more networks, including networks A-C (1520-1540). FIG. 15 is merely an example use case, and the present disclosure is not limited thereto. Although FIG. 15 shows three networks connected to the DSDN 1510, depending on the embodiment, less than or more than three networks can be connected to the DSDN 1510. Each of network A (1520), network B (1530), and network C (1540) may be connected to a different DSDN node within the DSDN (1510), where the networks A-C (1520-1540) are disparate heterogeneous networks. Each DSDN node that is connected to one of the networks A-C (1520-1540) may translate the data into a standard IP protocol using the processing steps as shown in FIG. 7. Then, the translated data can be shared with networks A-C (1520-1540). According to some embodiments, the use case example of FIG. 15 can improve interoperability of communication between multiple different hosts attached to the DSDN, where each host can use different datalinks that are normally incompatible.

Figure 16:
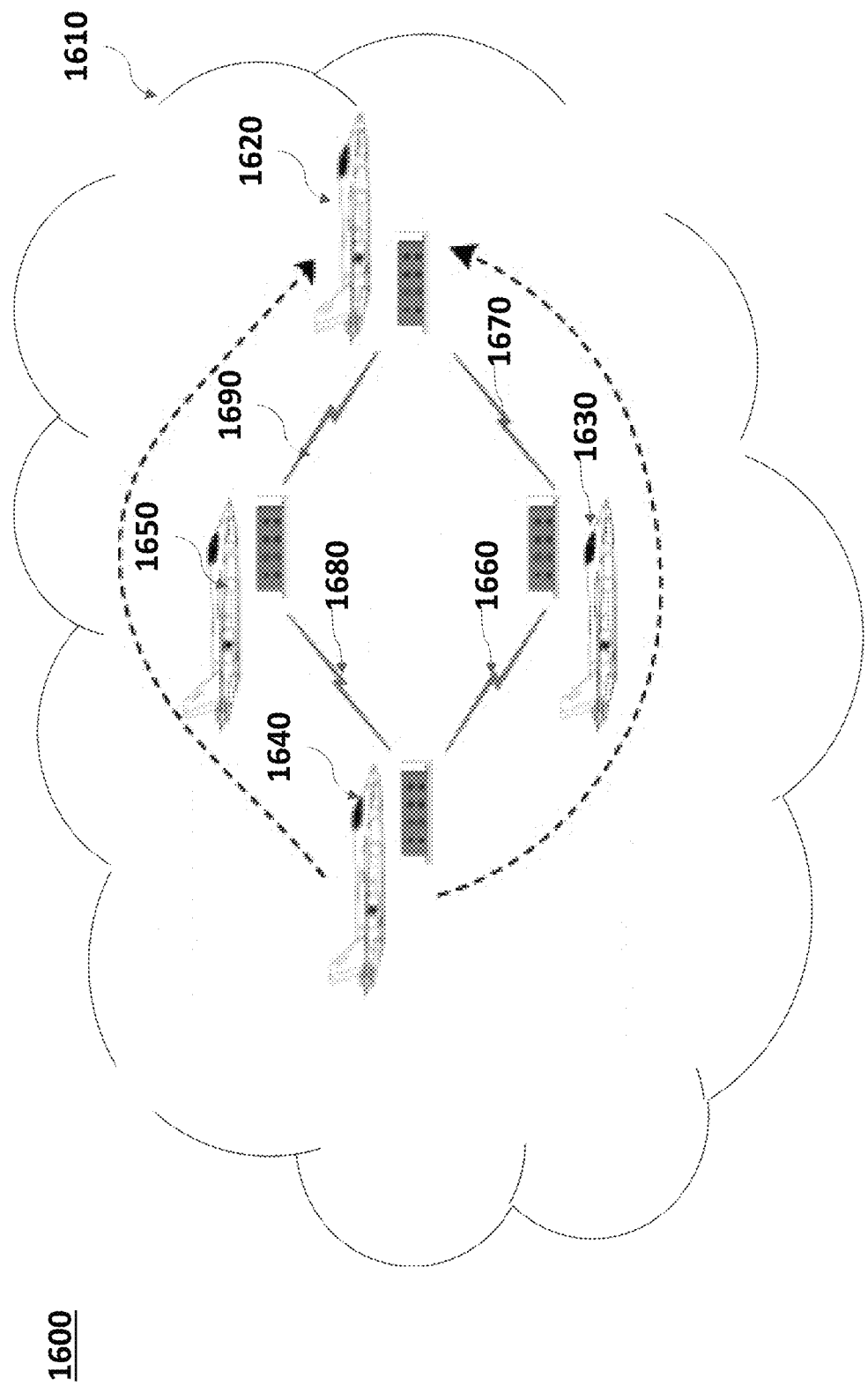
FIG. 16 illustrates an example of the DSDN use case, where the DSDN node continuously monitors the available DSDN nodes and communication paths according to some embodiments.

FIG. 16 illustrates another example DSDN use case in a network 1600, where the DSDN node continuously monitors the available DSDN nodes and communication paths, according to some embodiments. The DSDN 1610 may include four DSDN nodes including DSDN node 1 (1620), DSDN node 2 (1630), DSDN node 3 (1640), and DSDN node 4 (1650). FIG. 16 is merely an example use case and the present disclosure is not limited thereto. Although FIG. 16 shows four DSDN nodes, depending on the embodiment, less than or more than DSDN nodes can be provided in the DSDN 1610. Each DSDN node can monitor which DSDN nodes are directly or indirectly connected to the DSDN node and determine the quality of communication paths directly or indirectly connected to the DSDN node. For example, the DSDN node 4 (1640) can recognize that the DSDN nodes 3 and 5 (1630, 1650) are directly connected to the DSDN node 4 (1640). Furthermore, the DSDN node 4 (1640) can recognize that the DSDN node 2 (1620) is indirectly connected via communication paths (1680, 1690) or communication paths (1660, 1670). After recognizing the available DSDN nodes and communication paths, the DSDN node 4 (1640) may analyze the quality of the communication paths based on several factors, including (but not limited to) path cost, bandwidth, latency, link aggregation, redundancy, and so on, in real-time. According to some embodiments, the use case example of FIG. 16 can optimize a communication path between two DSDN nodes to account for changing communications link and network conditions in real-time and improve the probability of successful data delivery in dynamic wireless topologies.

In some embodiments, a non-transitory computer-readable medium having stored thereon instructions which when executed by at least one computing device performs all or a portion of the methods described.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A DSDN node can be or include a microprocessor, but in the alternative, the DSDN node can be or include a DSDN controller, micro DSDN controller, or state machine, combinations of the same, or the like configured to generate and analyze indicator feedback. The DSDN node can include electrical circuitry configured to process computer-executable instructions. Although described herein primarily with respect to digital technology, an image processing system may also include primarily analog components. For example, some or all of the image file analysis and rotation notation features described herein may be implemented in analog circuitry or mixed analog and digital circuitry. A computing environment can include a specialized computer system based on a microprocessor, a mainframe computer, a digital signal processor, a portable computing device, a device DSDN controller, or a computational engine within an appliance, to name a few.

The elements of a method, process, routine, or algorithm described in connection with the embodiments disclosed herein can be embodied directly in specifically tailored hardware, in a specialized software module executed by an image processing system, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An exemplary storage medium can be coupled to the image processing system such that the image processing system can read information from, and write information to, the storage medium. In the alternative, the storage medium can be integral to the image processing system. The DSDN node and the storage medium can reside in an application specific integrated circuit (ASIC). The ASIC can reside in an access device or other monitoring device. In the alternative, the DSDN node and the storage medium can reside as discrete components in an access device or other item processing device. In some embodiments, the method may be a computer-implemented method performed under the control of a computing device, such as an access device or other item processing device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some embodiments, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some embodiments, include a signal utilized to transmit one or more representations of the information. While recited in the singular, it will be understood that a message may be composed, transmitted, stored, received, etc. in multiple parts.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for communicating data in a distributed software-defined network (DSDN), including a plurality of DSDN nodes, the system comprising:
    a main DSDN node configured to be selected from the plurality of DSDN nodes, the main DSDN node comprising a plurality sets of routing information to transmit and receive a plurality sets of data between the plurality of DSDN nodes, the main DSDN node configured to:
        designate a DSDN source node and a DSDN destination node from the plurality of DSDN nodes, wherein the designation is predefined based on at least one set of routing information of the plurality sets of routing information and a set of data of the plurality sets of data, wherein the set of data is configured to be transmitted and received between the DSDN source node and the DSDN destination node;
        identify one or more available DSDN nodes from the plurality of DSDN nodes, wherein each DSDN node of the one or more available DSDN nodes is directly or indirectly connected to the DSDN source node and the DSDN destination node;
        create one or more communication paths between the DSDN source node and the DSDN destination node via the identified one or more available DSDN nodes;
        analyze a quality of each communication path of the created one or more communication paths between the DSDN source node and the DSDN destination node;
        select a first optimal communication path between the DSDN source node and the DSDN destination node among the created one or more communication paths based on analysis results of the quality of each communication path of the created one or more communication paths between the DSDN source node and the DSDN destination node; and
        transmit the set of data of the plurality of sets of data from the DSDN source node to the DSDN destination node via the first optimal communication path.

2. The system of claim 1, wherein the DSDN source node and the DSDN destination node are connected via the one or more available DSDN nodes within two hops.

3. The system of claim 1, wherein each set of the plurality sets of routing information includes data routing planning information for each set of the plurality sets of data.

4. The system of claim 1, wherein the main DSDN node is configured to analyze the quality of each communication path of the created one or more communication paths between the DSDN source node and the DSDN destination node based on at least one of a path cost, a bandwidth, a latency, a link aggregation, or a redundancy.

5. The system of claim 1, wherein the main DSDN node is further configured to monitor the quality of each communication path of the created one or more communication paths between the DSDN source node and the DSDN destination node in real-time.

6. The system of claim 1, wherein the main DSDN node is configured to cause the designated DSDN source node to generate the set of data in a standard IP format by:
   obtaining primitive data having a data protocol from one or more devices communicatively coupled with the DSDN source node, wherein the data protocol has a non-standard internet protocol (IP);
   extracting a destination node identifier, a data payload, and an additional data traffic management policy from a header of the data protocol;
   replicating the destination node identifier, the data payload, and the additional data traffic management policy; and
   inserting the replicated destination node identifier, the data payload, and the additional data traffic management policy into corresponding fields of the standard IP.

7. The system of claim 1, wherein the main DSDN node is further configured to:
   in response to detecting a degradation of the quality of the first optimal communication path, create a second optimal communication path by re-analyzing a quality of each communication path of the created one or more communication paths between the DSDN source node and the DSDN destination node;
   activate the second optimal communication path by deactivating one or more remaining communication paths; and
   transmit the set of data from the DSDN source node to the DSDN destination node via the second optimal communication path.

8. The system of claim 1, wherein the main DSDN node comprises an application layer, a transport layer, and a data layer.

9. The system of claim 8, wherein the data layer is configured to store each set of routing information of the plurality sets of routing information in a form of a routing table.

10. The system of claim 1, wherein the main DSDN node is further configured to activate the first optimal communication path by deactivating one or more remaining communication paths of the created one or more communication paths between the DSDN source node and the DSDN destination node.

11. The system of claim 1, wherein the main DSDN node is further configured to:
   determine a second optimal communication path between the DSDN source node and the DSDN destination node among the created one or more communication paths based on analysis results of the quality of each communication path of the created one or more communication paths between the DSDN source node and the DSDN destination node;
   monitor a quality of the first optimal communication path while transmitting the set of data from the DSDN source node to the DSDN destination node via the first optimal communication path;
   in response to monitoring results of the quality of the first optimal communication path indicating a communication path quality degradation, dynamically activate the second optimal communication path by deactivating the first optimal communication path; and
   continuously transmit remaining data of the set of data from the DSDN source node to the DSDN destination node via the second optimal communication path.

12. A method of communicating data in a distributed software-defined network (DSDN) including a plurality of DSDN nodes, the method comprising:
   designating a DSDN source node and a DSDN destination node from the plurality of DSDN nodes, wherein the designation is predefined based on at least one set of routing information of a plurality sets of routing information stored in a main DSDN node selected from the plurality of DSDN nodes, and wherein the at least one set of routing information of the plurality sets of routing information include routing information of one or more sets of data to be transmitted and received between the DSDN source node and the DSDN destination node;
   identifying one or more available DSDN nodes from the plurality of DSDN nodes, wherein each DSDN node of the one or more available DSDN nodes is directly or indirectly connected to the DSDN source node and the DSDN destination node;
   creating one or more communication paths between the DSDN source node and the DSDN destination node via the identified one or more available DSDN nodes;
   analyzing quality of each communication path of the created one or more communication paths between the DSDN source node and the DSDN destination node;
   selecting a first optimal communication path between the DSDN source node and the DSDN destination node among the created one or more communication paths based on analysis results of the quality of each communication path of the created one or more communication paths between the DSDN source node and the DSDN destination node;
   activating the first optimal communication path by deactivating one or more remaining communication paths of the created one or more communication paths between the DSDN source node and the DSDN destination node; and
   transmitting at least one set of data of the one or more sets of data from the DSDN source node to the DSDN destination node via the first optimal communication path.

13. The method of claim 12, wherein the DSDN source node and the DSDN destination node are connected via the one or more available DSDN nodes within two hops.

14. The method of claim 12, wherein the quality of each communication path of the created one or more communication paths between the DSDN source node and the DSDN destination node is analyzed based on at least one of a path cost, a bandwidth, a latency, a link aggregation, or a redundancy.

15. The method of claim 12, wherein the main DSDN node is further configured to monitor the quality of the first optimal communication path in real-time.

16. The method of claim 12, wherein each set of data of the one or more sets of data include a standard IP format generated by:
   obtaining primitive data having a data protocol from one or more devices communicatively coupled with the DSDN source node, wherein the data protocol has a non-standard internet protocol (IP);
   extracting a destination node identifier, a data payload, and an additional data traffic management policy from a header of the data protocol;
   replicating the destination node identifier, the data payload, and the additional data traffic management policy; and inserting the replicated destination node identifier, the data payload, and the additional data traffic management policy into corresponding fields of the standard IP.

17. The method of claim 12, the method further comprising:
   in response to detecting a degradation of the quality of the first optimal communication path, creating a second optimal communication path by re-analyzing a quality of each communication path of the created one or more communication paths between the DSDN source node and the DSDN destination node;
   activating the second optimal communication path by deactivating remaining one or more communication paths; and
   transmitting the at least one set of data of the one or more sets of data from the DSDN source node to the DSDN destination node via the second optimal communication path.

18. The method of claim 12, wherein the main DSDN node comprises an application layer, a transport layer, and a data layer.

19. The method of claim 18, wherein the data layer is configured to store the plurality sets of routing information in a form of a routing table.

20. The method of claim 12, wherein a full bandwidth is allocated to the first optimal communication path by deactivating the one or more remaining communication paths between the DSDN source node and the DSDN destination node.

21. A non-transitory computer readable medium storing instructions, when executed by one or more processors, configured to perform the method of claim 12.

* * * * *

UNITED STATES PATENT AND TRADEMARK OFFICE
CERTIFICATE OF CORRECTION

PATENT NO. : 12,199,869 B2
APPLICATION NO. : 18/418000
DATED : January 14, 2025
INVENTOR(S) : Robert Kunc et al.

Page 1 of 1

It is certified that error appears in the above-identified patent and that said Letters Patent is hereby corrected as shown below:

In the Specification

At Column 16, Line 60, delete "(the DSDM node))" and insert -- (the DSDN node) --.

Signed and Sealed this
Twenty-second Day of April, 2025

Coke Morgan Stewart
*Acting Director of the United States Patent and Trademark Office*